(12) United States Patent
Izutsu

(10) Patent No.: US 8,971,967 B2
(45) Date of Patent: Mar. 3, 2015

(54) MOBILE INFORMATION PROCESSING APPARATUS EQUIPPED WITH TOUCH PANEL DEVICE AND PROGRAM FOR MOBILE INFORMATION PROCESSING APPARATUS

(75) Inventor: Masahiro Izutsu, Tokyo (JP)

(73) Assignee: Dap Realize Inc., Tokyo (JP)

( * ) Notice: Subject to any disclaimer, the term of this patent is extended or adjusted under 35 U.S.C. 154(b) by 306 days.

(21) Appl. No.: 13/641,188

(22) PCT Filed: Apr. 18, 2011

(86) PCT No.: PCT/JP2011/059575
§ 371 (c)(1),
(2), (4) Date: Oct. 15, 2012

(87) PCT Pub. No.: WO2011/132652
PCT Pub. Date: Oct. 27, 2011

(65) Prior Publication Data
US 2013/0035143 A1 Feb. 7, 2013

(30) Foreign Application Priority Data
Apr. 19, 2010 (JP) .................................. 2010-095910

(51) Int. Cl.
*H04M 1/00* (2006.01)
*H04B 1/38* (2006.01)
(Continued)

(52) U.S. Cl.
CPC ......... *H04M 1/72527* (2013.01); *G06F 1/1632* (2013.01); *G06F 1/1656* (2013.01);
(Continued)

(58) Field of Classification Search
USPC ............. 455/566, 403, 412.2, 418, 419, 420, 455/550.1, 556.1; 710/2, 3, 5, 20; 725/80; 345/156, 173
See application file for complete search history.

(56) References Cited

U.S. PATENT DOCUMENTS 6,538,880 B1 3/2003 Kamijo et al.

FOREIGN PATENT DOCUMENTS

JP 2001-142563 5/2001
JP 2003-177839 6/2003
(Continued)

OTHER PUBLICATIONS

International Search Report issued Aug. 9, 2011 in International (PCT) Application No. PCT/JP2011/059575.
(Continued)

*Primary Examiner* — Shaima Q Aminzay
(74) *Attorney, Agent, or Firm* — Wenderoth, Lind & Ponack, L.L.P.

(57) ABSTRACT

[PROBLEMS] To improve user's convenience by cordoning off both of a screen for input and that for output, of which size and resolution is sufficiently large, in mobile information processing apparatus comprising a touch panel device. This is achieved only by additionally providing an interface device between the external unit and further additionally providing some functions to a signal processing and control device originally belonging to the mobile information processing apparatus.
[MEANS FOR SOLVING PROBLEMS] Mobile information processing apparatus comprising a touch panel device; wherein an interface device is provided which sends an external display signal to the external unit equipped with a display device; and wherein a signal processing and control device can select control mode 1, in which it generates one digital display signal, and sends it to a touch panel device, and control mode 2, in which it generates two digital display signals and sends one to a touch panel device, and the other to an external output interface device.

12 Claims, 16 Drawing Sheets

(51) Int. Cl.
*H04M 1/725* (2006.01)
*G06F 1/16* (2006.01)
*G06F 3/038* (2013.01)
*G06F 3/0488* (2013.01)
*A63F 13/20* (2014.01)
*A63F 13/30* (2014.01)
*H04M 1/04* (2006.01)

(52) U.S. Cl.
CPC ............ *G06F1/1684* (2013.01); *G06F 1/1692* (2013.01); *G06F 3/038* (2013.01); *G06F 3/0488* (2013.01); *G06F 3/04886* (2013.01); *A63F 13/06* (2013.01); *A63F 13/12* (2013.01); *H04M 1/04* (2013.01); *H04M 1/7253* (2013.01); *H04M 2250/22* (2013.01); *A63F 2300/1031* (2013.01); *A63F 2300/1068* (2013.01); *A63F 2300/403* (2013.01)
USPC ........................................................ 455/566

(56) References Cited

FOREIGN PATENT DOCUMENTS

| | | |
|---|---|---|
| JP | 2008-141519 | 6/2008 |
| JP | 2009-289205 | 12/2009 |
| JP | 2010-3307 | 1/2010 |

OTHER PUBLICATIONS

Mac to Nakayoshi iPhone ga Suki ni Naru, Mac People, vol. 16, No. 1, p. 156, Dec. 1, 2009 (Jan. 12, 2009 received date).

MOBILE INFORMATION PROCESSING APPARATUS EQUIPPED WITH TOUCH PANEL DEVICE AND PROGRAM FOR MOBILE INFORMATION PROCESSING APPARATUS

TECHNICAL FIELD

The present invention relates to a mobile information processing apparatus equipped with a touch panel device, and a program for the mobile information processing apparatus, and it relates especially to a mobile information processing apparatus equipped with a touch panel device and an external output interface device, which is connected to an external unit with a display device or to an external unit with a touch panel device, and a program for the mobile information processing apparatus.

BACKGROUND ART

Recently, a mobile information processing apparatus equipped with a touch panel device is used, and especially, in the field of a cellular phone, a touch-panel smart phone which is represented by iPhone (registered trademark) by Apple Inc. is sold increasingly.

Hereinafter, "a mobile information processing apparatus equipped with a touch panel device" is referred as "a touch-panel mobile information processing apparatus".

In the case of a touch-panel mobile information processing apparatus, a suitable input interface for each application can be realized, since an input screen display of a touch panel can be changed variously by a software. For example, in the case of a touch-panel smart phone, a user can carry out a data input operation on a suitable input screen for each input operation such as a telephone number input for a telephone call, a character input for sending an E-mail, and, more over, a data input for operating various application software containing a game program, and, as a result, the convenience of data input is much more improved than a cellular phone only with a hard key.

Patent Document 1: Japanese laid-open patent publication No. 2008-141519

Patent Document 1: Japanese laid-open patent publication No. 2010-003307

By the way, in the case of a touch-panel mobile information processing apparatus, it is usual that a touch-panel screen is divided into a input area and a display area, and data is inputted by manual operation such as touch or push of the input area and shield of light incoming on the input area, when the input contents are intricately and abundant in such a case as inputting substances.

However, in the case of a mobile information processing apparatus including at least a cellular phone, a smart phone and PDA (Personal Digital Assistant), size and screen resolution (number of level pixels×number of perpendicular pixels) of a attached display cannot be increased in vain, since its portability is thought as important. If, despite of the limitation, the touch-panel screen is divided as mentioned above, the size and displayable pixels of the input area of the screen will become so small that number of keys should be restricted even though, for example, key board for inputting characters (such as letters, numbers and symbols). As a result, in the case of a character input for sending an e-mail, user suffers such inconvenience as to change the display mode of the input area between the case of letter input and the case of number input and to touch the same key repeatedly. For example, in order to input the fifth character of the Japanese syllabary, user is required to push a certain key, which is assigned to first line of the Japanese syllabary ("kana"), five times after changing an input mode to "kana".

On the other hand, the similar inconvenience occurs also in a display area. Since some part of touch-panel screens, of which size and screen resolution are originally small, is devoted to an input area for data input, contents or image pixels which can be displayed on a display area will be decreased further. For this reason, the problem that the whole text cannot be read without frequent scroll will arise when user polishes the text inputted, for example, on the occasion of text creation of an e-mail.

SUMMARY OF INVENTION

Technical Problem

The present invention is invented considering the above-mentioned circumstances, and an object of the invention is to provide a touch-panel mobile information processing apparatus, of which size and screen resolution is large enough, and to improve convenience of its user, only with an addition of an interface device to an external unit and a little addition of functions to its own signal processing and control device.

Solution to Problem

In order to achieve above objectives, according to the first invention of the present invention related to a mobile information processing apparatus, there is provided a mobile information processing apparatus comprising: a touch panel device which has the following functions: a display function to indicate an image on a screen according to a digital display signal, which is received from aftermentioned signal processing and control device; and a input function to detect a manual operation including at least a touch or a push of a screen surface and a shield of incoming light and to generate and send a manual operation signal to aftermentioned signal processing and control device, wherein "a manual operation signal" means "a signal corresponding to a manual operation"; a storage device which stores a program, which activates aftermentioned signal processing and control device; a signal processing and control device which converts the manual operation signal, which is received from said touch panel device signal, to data, generates a digital display signal, according to the data and the program stored in said storage device and sends the digital display signal to said touch panel device and/or aftermentioned external output interface device; and an external output interface device which is connected to an external unit, which is equipped with or is connected to a display device, and sends an external display signal to the external unit according to the digital display signal received from said signal processing and control device; wherein said signal processing and control device selects the following two control mode alternatively: control mode 1, in which the manual operation signal received from said touch panel device is converted to data, and only a single line of digital display signal is generated and is sent to said touch panel device; and control mode 2, in which the manual operation signal received from said touch panel device is converted to data in a different way from control mode 1, two lines of digital display signal are generated, and one is sent to said touch panel device and the other to said external output interface device.

And according to the second invention of the present invention related to a mobile information processing apparatus, there is provided a mobile information processing apparatus according to the first invention, wherein said signal processing and control device sends a higher-resolution digital display signal to said external output interface device in said control mode 2, wherein "a higher-resolution digital display signal" means "a digital display signal of which intrinsic resolution is higher than the screen resolution of said touch panel device".

Note that "an intrinsic resolution of a display signal" in DESCRIPTION and CLAIMS means "a resolution of a image, which is displayed in a display device with a sufficient screen resolution, when it receives the display signal and processes it appropriately". And "a display device processes a display signal appropriately" means "a display device realizes logical color information of a display signal per pixel as color display of physical pixel which constitutes its screen with neither excess nor deficiency", and, more specifically, means "a display device realizes logical color information of a display signal as color display of physical pixel without reducing resolution of a display image by thinning out a pixel nor enlarging resolution of a display image by interpolating a pixel.

And according to the third invention of the present invention related to a mobile information processing apparatus, there is provided a mobile information processing apparatus according to the first or the second invention, further comprising a connection detection device which detects that said external unit is connected to said external output interface device in the condition that the display device is operable, and sends a signal to said signal processing and control device; wherein said signal processing and control device selects control mode 2 automatically or according to the manual operation signal from said touch panel device, when receiving a signal, which means that said external unit is connected to said external output interface device in the condition that the display device is operable.

And according to the fourth invention of the present invention related to a mobile information processing apparatus, there is provided a mobile information processing apparatus according to any one of the first to the third invention, wherein said signal processing and control device sends a digital display signal of a screen image with a keyboard simulated image displayed in the whole or in the most part of the touch panel device, and selects keyboard display sub-mode, in which a manual operation signal to a keyboard simulated image display area, which is received from said touch panel device, is converted to character data in said control mode 2, wherein "a keyboard simulated image" means "an image which simulates a keyboard for a character input", and "a manual operation signal" means "a signal corresponding to a manual operation".

And according to the fifth invention of the present invention related to a mobile information processing apparatus, there is provided a mobile information processing apparatus according to any one of the first to the fourth invention, wherein said signal processing and control device sends a digital display signal of a screen image with a handwriting input area displayed in the whole or in the most part of the touch panel device, and selects handwriting input sub-mode, in which a manual operation signal to the handwriting input area, which is received from said touch panel device, is converted to character data or drawing data in said control mode 2, wherein "a manual operation signal" means "a signal corresponding to a manual operation".

And according to the sixth invention of the present invention related to a mobile information processing apparatus, there is provided a mobile information processing apparatus according to any one of the first to the fifth invention, wherein said signal processing and control device sends a digital display signal of a screen image with a game controller simulated image displayed in the whole or in the most part of the touch panel device, and selects game controller display sub-mode, in which a manual operation signal to the game controller simulated image display area, which is received from said touch panel device, is converted to game input data in said control mode 2, wherein "a game controller simulated image" means "an image which simulates a game controller" and "a manual operation signal" means "a signal corresponding to a manual operation".

And according to the seventh invention of the present invention related to a mobile information processing apparatus, there is provided a mobile information processing apparatus according to any one of the first to the sixth invention, further comprising an external input interface which is connected to an external unit, which is equipped with or is connected to a manual input device, and receives an external manual operation signal, which is generated by the manual input device of the external unit, and sends the external manual operation signal to said signal processing and control device, and said external input interface device is provided integrally with or separately with said external outout interface device; wherein said signal processing and control device processes the manual operation signal received from said touch panel device and the external manual operation signal received from said external input interface device in parallel, converts these operation signal into data, and generates a digital display signal according the data in control mode 2.

And according to the eighth invention of the present invention related to a program for a mobile information processing apparatus, there is provided A program which is stored in the storage device of mobile information processing apparatus according any one of the first to the sixth invention, which makes said signal processing and control device select said control mode 1 and said control mode 2 alternatively.

And according to the ninth invention of the present invention related to a mobile information processing apparatus, there is provided a mobile information processing apparatus comprising: a touch panel device which has the following functions: a display function to indicate an image on a screen according to a digital display signal, which is received from aftermentioned signal processing and control device; and an input function to detect a manual operation including at least a touch or a push of a screen surface and a shield of incoming light and to generate and send a manual operation signal to aftermentioned signal processing and control device, wherein "a manual operation signal" means "a signal corresponding to a manual operation"; a storage device which stores a program, which activates aftermentioned signal processing and control device; a signal processing and control device which converts the manual operation signal, which is received from said touch panel device and/or aftermentioned external input/output interface device, to data, generates a digital display signal, according to the data and the program stored in said storage device and sends the digital display signal to said touch panel device and/or aftermentioned external input/output interface device; and an external input/output interface device which is connected to an external unit, which is equipped with or is connected to a touch panel device, sends an external display signal to the external unit according to the digital display signal received from said signal processing and control device, receives an external manual operation signal inputted by the touch panel device in the external unit and sends the manual operation signal to said signal processing and control device; wherein said signal processing and control device selects the following two control mode alternatively: control mode A, in which the manual operation signal received from said touch panel device is converted to data, and a generated digital display signal is sent to said touch panel device; and control mode B, in which the manual operation signal received from said external input/output interface device is converted to data, and a generated digital display signal is sent to said external input/output interface device.

"An external input/output interface device" in DESCRIPTION and CLAIMS can be either a integrally constituted interface device, which has both of an external output interface function to send an external display signal to an external unit with a touch panel device and an external input interface function to receive a manual operation signal from an external unit with a touch panel device, or a interface device, which is composed of an external output interface device to send an external display signal to an external unit with a touch panel device and an external input interface device to receive a manual operation signal from an external unit with a touch panel device.

In control mode B, said signal processing and control device can either process only an external manual operation signal received from said external input/output interface device or process an external manual operation signal received from said external input/output interface device and a manual operation signal received from a touch panel device in mobile information processing apparatus in parallel. And it is possible either that a single line of digital display signal is generated and is sent to an external input/output interface device or that two lines of digital display signal are generated, and one is sent to said external output interface device and the other to a touch panel device in a mobile information processing apparatus.

And according to the tenth invention of the present invention related to a mobile information processing apparatus, there is provided a mobile information processing apparatus according to the ninth invention, wherein said signal processing and control device sends a higher-resolution digital display signal to said external input/output interface device in said control mode B, wherein "a higher-resolution digital display signal" means "a digital display signal of which intrinsic resolution is higher than the screen resolution of said touch panel device".

And according to the eleventh invention of the present invention related to a mobile information processing apparatus, there is provided a mobile information processing apparatus according to the ninth or the tenth invention, further comprising a connection detection device which detects that said external unit is connected to said external input/output interface device in the condition that the display device is operable, and sends a signal to said signal processing and control device; wherein said signal processing and control device selects control mode B automatically or according to the manual operation signal from said touch panel device, when receiving a signal, which means that said external unit is connected to said external output interface device in the condition that the display device is operable.

And according to the twelfth invention of the present invention related to a program for a mobile information processing apparatus, there is provided A program which is stored in the storage device of mobile information processing apparatus according any one of the ninth to the eleventh invention, which makes said signal processing and control device select said control mode A and said control mode B alternatively.

And according to the thirteenth invention of the present invention related to a mobile information processing apparatus, there is provided a mobile information processing apparatus according to any one of the first to the seventh invention or any one of the ninth to the eleventh invention, further comprising a wireless communication device which receives and converts a wireless signal into a digital signal and sends the digital signal to said signal processing and control device, and converts a digital signal, which is received from said signal processing and control device, into a wireless signal and sends the wireless signal; wherein said signal processing and control device converts the manual operation signal received from said touch panel device to data, makes necessary processes on the digital signal received from said wireless communication device according to the data, and generates a digital display signal by processing in real time or by reading out and processing a data file, which is once stored in said storage device.

Advantageous Effects of Invention

A mobile information processing apparatus according to any one of the first or the seventh invention has control mode 2, where two types of digital display signals are generated, and one is send to the touch panel of the mobile information processing apparatus and the other is send to an external output interface device, in addition to control mode 1, which is the same processing mode as in the usual touch-panel mobile information processing apparatus. For this reason, it is possible to use a touch panel device in a mobile information processing apparatus only for data input, and to display an image, which is generated according to the input data corresponding to the manual operation signal received from a touch panel device, on the display device which accompanied by the external unit connected to an external output interface device.

For this reason, it can be avoided that the size of an input area or a display area becomes so small that user's convenience should be spoiled even in the case that complicated input operation is required, since it is not necessary to divide a touch-panel screen into an input area and a display area unlike the usual touch-panel mobile information processing apparatus.

Especially in a game use, a mobile information processing apparatus can be used as a two screen game machine like Nintendo DS (registered trademark) of Nintendo Co., Ltd., and it is possible to enjoy a software, which is oriented to two screen game machine only by adding an easy correction.

Especially according to the second invention, an image, of which resolution is higher than screen resolution of the attached touch panel device, can be displayed on the screen of a display device of which screen resolution is higher than a attached touch panel device, by connecting the external unit accompanied by the higher-resolution external display to an external output interface device.

Hereinafter, "a display device of which screen resolution is higher than a attached touch panel device" is referred as "a higher-resolution external display".

In a conventional touch-panel mobile information processing apparatus, screen scrolling or page turning is so frequently required that a smooth understanding had been barred when browsing a web page or a digital book, since the amount of information which is indicates on a screen at once was limited due to restrictions of the screen resolution of an attached touch panel device. Moreover, even if a high-definition image (a still image or a moving image) is downloaded from the Internet, it is impossible to enjoy it in an intrinsic resolution. And it is also impossible to enjoy a game which is accompanied by a high definition image from restrictions of the screen resolution of an attached touch panel device. According to the second invention, however, it becomes possible to make it easy for a user to understand of a web page or a book by indicating a lot of information on a screen at once, and also to enjoy a higher-definition image (a still image and a moving image) or a game which is accompanied by higher-definition images, since the user is freed from the restriction of screen resolution of the attached touch panel device.

And especially according to the 3rd invention, it can be prevented that a touch-panel mobile information processing apparatus cannot be used as usual (that means in control mode 1) even in the state where it is not connected to an external unit, for example, since the control mode 2 is selectable only when the external unit accompanied by a display device is connected in the state where the display device can be operated.

On the other hand, especially according to the fourth invention, sufficient number of the keys can be displayed, since a keyboard simulated image can be displayed in the whole or in the most part of an attached touch panel device. For this reason, it is not necessary to change the display of an input area when inputting characters, according whether letters are inputted or numbers and symbols are inputted like the conventional touch-panel mobile information processing apparatus.

And especially according to especially the fifth invention, a sufficient handwriting input area can be used, since a handwriting input area can be displayed in the whole or in the most part of an attached touch panel device. For this reason, a letter with many stroke counts and complicated drawing can also be inputted without difficulties using fingers or a touch pen (stylus).

And especially according to the sixth invention, it is possible to enjoy a game by using a mobile information processing apparatus of the present invention itself as a game controller, since a game controller simulated image can be displayed in the whole or in the most part of an attached touch panel device.

On the other hand, especially according to the seventh invention, the convenience of input operation can be further improved, since, in control mode 2, a touch-panel mobile information processing apparatus and a manual input device accompanied by an external unit, which is connected an external input interface device, can be used together for data input. The same input operation like a PC (personal computer), to which a keyboard with a touchpad or a keyboard with a handwriting pad is connected, can be realized, especially by adopting a keyboard equipment with an insertion part, where a touch-panel mobile information processing apparatus can be inserted, and utilizing the touch-panel screen of the touch-panel mobile information processing apparatus, which is inserted in and is connected to the insertion part as a touchpad or a handwriting pad.

And by installing a program for a mobile information processing apparatus according to the eighth invention in a storage device of a mobile information processing apparatus, and making the program drive a signal processing and control device of the mobile information processing apparatus, it becomes possible that control mode 1 and control mode 2 can be selected alternatively.

On the other hand, a mobile information processing apparatus according to any one of the ninth to the eleventh invention, is equipped with an external input/output interface device, and has control mode B, where a manual operation signal, which is received from the external input/output interface device, is converted into data, and the generated digital display signal is sent to the said external input/output interface device, in addition to control mode A, which is the same processing mode as in the usual touch-panel mobile information processing apparatus. For this reason, the same operation and processing as a so-called tablet PC are realized, by connecting an external unit accompanied by a large-sized touch panel device to a small-sized touch-panel mobile information processing apparatus like a smart phone.

And moreover, in this case, the external unit is required only to be equipped with a touch panel device, which has a display function and an input function, and an interface device with touch-panel mobile information processing apparatus, but not to be equipped with such a signal processing and control device as advanced CPU (Central Processing Unit), with which a usual tablet PC is equipped. For this reason, it is more economical than using together a smart phone and a tablet PC which are independently equipped with a signal processing and control device (and OS (Operating System) and application software for them), respectively. Moreover, user is not bothered to synchronize an application software or data, as in the case using a smart phone and a tablet PC together, either.

Especially according to the 10th invention, by connecting an external unit accompanied by a touch panel device, of which screen resolution is higher than a attached touch panel device, to an external input/output interface device, an image, of which resolution is higher than screen resolution of the attached touch panel device, can be displayed on the screen of the higher-resolution touch panel device.

Hereinafter, "a touch panel device of which screen resolution is higher than a attached touch panel device" is referred as "a higher-resolution touch panel device".

In a conventional touch-panel mobile information processing apparatus, screen scrolling or page turning is so frequently required that a smooth understanding had been barred when browsing a web page or a digital book, since the amount of information which is indicates on a screen at once was limited due to restrictions of the screen resolution of an attached touch panel device. Moreover, even if a high-definition image (a still image or a moving image) is downloaded from the Internet, it is impossible to enjoy it in an intrinsic resolution. And it is also impossible to enjoy a game which is accompanied by a high definition image from restrictions of the screen resolution of an attached touch panel device. According to the second invention, however, it becomes possible to make it easy for the user to understand of a web page or a book by indicating a lot of information on a screen at once, and also to enjoy a higher-definition image (a still image and a moving image) or a game which is accompanied by higher-definition images, since the user is freed from the restriction of screen resolution of the attached touch panel device like the second invention.

And especially according to the eleventh invention, it can be prevented that a touch-panel mobile information processing apparatus cannot be used as usual (that means in the control mode A) even in the state where it is not connected to an external unit, for example, since the control mode B is selectable only when the external unit accompanied by a touch panel device is connected in the state where the touch panel device can be operated.

And by installing a program for a mobile information processing apparatus according to the twelfth invention in a storage device of a mobile information processing apparatus, and making the program drive a signal processing and control device of the mobile information processing apparatus, it becomes possible that control mode A and control mode B are realized alternatively.

On the other hand, especially according to the thirteenth invention, it becomes possible to display a image, such as a web page, a still image and a moving image, not only on an attached touch panel device but also on an display device accompanied by an external unit connected to the external output interface device or on an touch panel device accompanied by an external unit connected to the external input/output interface device, by downloading and processing an HTML file and a graphics file from a web server linked to the Internet.

DESCRIPTION OF EMBODIMENTS

Hereinafter, embodiments of the present invention will be described with reference to the drawings. Note that the present invention is not restricted to the following embodiments and many variations are possible within the spirit and scope of the present invention.

FIG. 1 is a block diagram showing a constitution and a function of the first embodiment of the present invention of a mobile information processing apparatus and an information processing system which is composed by connecting the mobile information processing apparatus and an external unit equipped with a display device, especially in the case that the mobile information processing apparatus is a smart phone.

In this embodiment, a smart phone 1 can be used by itself for telephone call, data communication and processing, or storage and reproduction of image data and/or sound data, and various images are displayed on a touch panel 14A in the case other than telephone call usage.

Hereinafter, it is assumed that screen's resolution of the touch panel 14A is half VGA (horizontal×vertical=320×480 pixels), but another screen's resolution is possible.

Firstly, when the smart phone 1 is used for telephone call, a sound picked up by a microphone 13A is converted to a digital signal by a CODEC (COder-DECoder) 13C and the digital signal goes through a baseband processor 11A and an RF (Radio Frequency) sending/receiving part 12B and is sent to public network as a wireless signal from a communication antenna 12A. In reverse, a wireless signal from public network is received by the communication antenna 12A and is converted to a digital signal by going through a RF sending/receiving part 12B and the baseband processor 11A. The digital signal is converted to an analog electrical signal and is finally is outputted as sound from a speaker 13B.

Note that sending and receiving of an wireless signal is realized by communicating with a base station of cellular network in the form such as CDMA (Code Division Multiple Access) or by communicating with a base station or an access point of wireless LAN in the form such as DSSS (Direct Sequence Spread Spectrum) and OFDM (Orthogonal Frequency Division Multiplexing).

Secondly, when the smart phone 1 is used for data communication and processing, data, which is included in a signal generated by a detection of touch of the touch panel 14A by finger or touch pen (stylus) and converted to a digital signal by a manual input controller 14E, and/or data, which is included in an wireless signal conforming to the Internet Protocol and received from public network, goes through the RF sending/receiving part 12B and the baseband processor 11A and is converted to a digital signal, and/or data, which is read out from data files (image data files, sound data files, etc.) in a flash memory 15A are sent to a central processing circuit 11B via a bus 17. The central processing circuit 11B makes necessary processes on the data, according to a program stored in the flash memory 15A, and sends the processed data to a RAM (Random Access Memory) 15B, a graphic controller 14B and the baseband processor 11 via the bus 17. And eventually, an image is displayed on the screen of the touch panel 14A, a sound is outputted from the speaker 13B, an wireless signal is sent from the communication antenna 12A, or data is stored at the flash memory 15A.

Especially, a data signal and a data flow until an image is displayed on the touch panel 14A are as follows: The central processing circuit 11B, according to a program stored in the flash memory 15A, commands the graphic controller 14B to generate bit-mapped data describing an image with a resolution corresponding to the screen resolution of the touch panel 14A and send it to a LCD (Liquid Crystal Display) driver 14D. A graphics controller 14B generates bit map data, according to the plotting command, and send it to an LCD driver 14D, while writing on and/or reading out from a VRAM (Video RAM) 14C, if necessary. The LCD driver 14D activates each pixel, which constitutes the screen of the touch panel 14A, by making a source driver part and a gate driver part work according to the bit-mapped data and eventually displays various images and screen images on the touch panel 14A.

Note that sending and receiving of a wireless signal conforming to the Internet Protocol is realized by various communication systems. It is possible that communication is conducted by a high-speed wireless LAN system in the area close to an access point of wireless LAN, such as indoor, and otherwise by the third generation mobile communications (cellular system), such as a CDMA system, by making the communication antenna 12A, the RF sending/receiving part 12B, and the baseband processor 11A responsive to several band frequencies.

And an image data file and/or sound data file can be stored in the flash memory 15A in the case that the central processing circuit 11A receives and make necessary processes on a digital signal, which is received via the communication antenna 11A, the RF sending/receiving part 12B and the baseband processor 11A by accessing a web site.

At that time, image data is stored in MPEG (Moving Picture Experts Group) format such as MPEG-1, MPEG-2, MPEG-4) in the case of a moving image, and is stored in such format as EMP, TIFF, JPEG, GIF and PNG in the case of a still image. And sound data is stored in such format as WAVE format, MP3 (MPEG Audio Layer 3) and ATRAC3 (Adaptive TRansform Acoustic Coding 3).

FIG. 2 is an image showing a screen image which is displayed on a touch panel belonging to the first embodiment of the present invention of a mobile processing communication apparatus, when text of an e-mail is inputted by using the mobile processing communication apparatus solely.

When text of an e-mail is inputted by using the smart phone 1 solely, the screen of the touch panel 14A is divided into a touch panel display area 14A1 and a touch panel input area 14A2, and keys showing the lines of "kana" (first line of "kana", second line of "kana", etc.) are displayed on the touch panel input area 14A2. A user can input a "kana" character by touching these key displays with fingers or a touch pen (stylus). For example, the fifteenth character of "kana" can be inputted by pushing a key, which is assigned to third line of "kana" five times.

FIG. 3 is another image showing a screen image which is displayed on a touch panel belonging to the first embodiment of the present invention of a mobile processing communication apparatus, when text of an e-mail is inputted by using the mobile processing communication apparatus solely.

FIG. 4 is yet another image showing a screen image which is displayed on a touch panel belonging to the first embodiment of the present invention of a mobile processing communication apparatus, when text of an e-mail is inputted by using the mobile processing communication apparatus solely.

When text of an e-mail is inputted by using the smart phone 1 solely, a change key for symbol input 14A21, a change key for number input 14A22, a change key for alphabet input 14A23, and a change key for "kana" input 14A24 are displayed on the screen of the touch panel 14A. FIG. 2 shows the screen image displayed when the change key for "kana" input 14A24 is touched, and, on the other hand, a screen image shown in FIG. 3 is displayed when the change key for alphabet input 14A23 is touched, and a screen image shown in FIG. 4 is displayed when the change key for number input 14A22 is touched, respectively. And, letter "S" of alphabet can be inputted by pushing a key, which is assigned to "PARS" four times.

And the data inputted by touch operations to the touch panel input area 14A2, which was explained above, is displayed on the touch panel display area 14A1.

A user checks the text displayed on the touch panel display area 14A1 and send it after correction, if needed, but it is necessary to repeat scrolling of a screen repeatedly in order to check the whole text of an e-mail, since there is little amount of information displayed on the touch panel display area 14A1 as shown also in a figures.

Hereinbefore, described is the outline of the function of the smart phone 1 in the case when it used solely.

Hereinafter, "in the case when the smart phone 1 used solely" referred as "sole use case".

On the other hand, the smart phone 1 is equipped with an interface part A_16B for connecting with an external output unit 2, and the external output unit 2 is equipped with an external LCD panel 24A and is also equipped with an interface part B_26B for connecting with the smart phone 1. Thus, the smart phone 1 and the external output unit 2 can be operated as an integrated information communication system, by connecting the interface part A_16B of the smart phone 1, and the interface part B_26B of the external output unit 2 through the connection cable 5.

Note that, hereinafter, it is assumed that a screen's resolution of the external LCD panel 24A is XGA (horizontal× vertical=1024×768 pixels, in the case of horizontally long configuration) in principle, but another resolution is possible.

When the smart phone 1 in work and the external output unit 2, of which external LCD panel is in displayable condition, are connected with each other, or when the smart phone 1 in work and the external output unit 2 are connected with each other, and then the external output unit 2 is made to work and to be in displayable condition, or when the smart phone 1 and the external output unit 2 in work are connected with each other, and then the smart phone 1 is made to work, the central processing circuit 11B of the smart phone 1 receives a signal, which means that the external output unit 2 is detected to be connected, and screen's resolution data of the external LCD panel 24A of the external unit 2 from the external output unit 2 via the interface part B_26B, the connection cable 5, the interface part A_16B and the bus 17.

Hereinafter, "an external LCD panel of the external output unit 2 is in displayable condition" is referred as "an external output unit 2 is in work". And "a signal, which means that one is detected to be connected" is referred as "one's connection detection signal".

And when the connection detection signal of the external output unit 2 and the screen resolution data of the external LCD panel 24A of the external output unit 2 are received, the central processing circuit 11B of the smart phone 1 comes to work in different control mode from that in sole use case, which is explained above, as follows: It commands the graphic controller 14B not only to generate bit-mapped data describing an image with a resolution corresponding to the screen resolution of the touch panel 14A and send it to the LCD driver 14D, but also to generate bit-mapped data describing an image with a resolution corresponding to the screen resolution of the external LCD panel and send it to a TMDS transmitter (Transition Minimized Differential Signaling) 16A.

Note that, in this case, the image to which the bit-mapped data sent to the LCD driver 14D correspond is a different image from that in sole use case, and, as a result, a different image from that in sole use case is displayed in the touch panel 14A, as explained in detail later.

On the other hand, the bit-mapped data sent to the TMDS transmitter 16A is converted to the external display signal, which is sent in a TMDS format, and the signal is received by the interface part B_26B of the external output unit 2 via the interface part A_16B of the smart phone 1. The external display signal is subjected to necessary process in a TMDS receiver 26A and is sent to an external LCD driver 24D. And then the external LCD driver 24A drives each pixel, which constitutes the screen of the external LCD panel 24A. Eventually, a screen image is displayed on the external LCD panel 24A.

Note that neither the external output unit 2 is required to be equipped with a signal processing device for restoring a compressed signal, nor a signal conversion of "digital (bit-mapped data)→analog→digital" is required, since TMDS is a non-compressing digital transmission format. Thus, degradation of the image accompanying signal transformation is avoidable.

Note that, when a so-called HD television receiving set (horizontal×vertical=1280×720 pixels) and a so-called full HD television receiving set (horizontal×vertical=1920×1080 pixels) are used as the external output unit 2, both of the interface part A_16B of the smart phone 1 and the interface part B_26B of the external output unit 2 can follows HDMI (High Definition Multimedia Interface) standards, and a HDMI transmitter and a HDMI receiver can be used for the TMDS transmitter 16A and the TMDS receiver 26A, respectively.

Moreover, as a transmission format of the external display signal sent to the interface part B_26B of the external output unit 2 from the interface part A_16B of the smart phone 1, a different format other than a TMDS format is employable. If a transmission format including at least digital RGB, LVDS (Low Voltage Differential Signaling) (or LDI (LVDS Display Interface)), GVIF (Gigabit Video InterFace), USB (Universal Serial Bus), and DisplayPort, which is a non-compressing digital transmission format like TMDS, are adopted, neither the external output unit 2 is required to be equipped with a signal processing device for restoring a compressed signal, nor a signal conversion of "digital (bit-mapped data) →analog→digital" is required, like in the case of TMDS format.

FIG. 5 is an image showing a keyboard simulated image which is displayed on a touch panel belonging to the first embodiment of the present invention of a mobile processing communication apparatus, when text of an e-mail is inputted by using the mobile processing communication apparatus in connection with an external unit equipped with a display device.

And FIG. 6 is an outline diagram showing a constitution of an information processing system which is composed by connecting the first embodiment of the present invention of a mobile information processing apparatus and an external unit equipped with a display device, and an screen image which is displayed on the screen of the display device.

When the text of an E-mail is inputted in the condition that the smart phone 1 is connected with the external output unit 2, a screen image which simulates a keyboard of a usual notebook PC or net book is displayed in the most part of screen of the touch panel 14A, and a user can input a character by touching key display in this keyboard simulated image with fingers or a touch pen (stylus).

In this case, unlike the case that the smart phone 1 is used solely, alphabet letters, numbers, and symbols are displayed on the same screen, and, moreover, one alphabet letter corresponds to one key display. For this reason, unlike sole use case, it becomes unnecessary to change an alphabet input screen and a number input screen alternately, or to touch a key display repeatedly in order to input the one alphabet letter, and therefore, the complicatedness of a character input is reduced remarkably.

On the other hand, data inputted by the touch operation to the keyboard simulated image of the touch panel 14A of the smart phone 1 is displayed on the external LCD panel 24A of the external output unit 2.

A user checks text displayed on external LCD panel 24A and send it after correction, if necessary, the whole text of an e-mail can be displayed and it is not necessary to scroll a screen when checking text before sending, except for the case of a extremely long text, since the size and screen resolution of the external LCD panel 24A are larger than the size and screen resolution of the touch panel 14A as shown in the figure.

FIG. 7 is an image showing a drawing image which is displayed in a handwriting input area of a touch panel belonging to the first embodiment of the present invention of a mobile processing communication apparatus, when a drawing is inputted by using the mobile processing communication apparatus in connection with an external unit equipped with a display device.

The smart phone 1 is can be used for various uses in addition to an e-mail input and sending in the state connected to the external output unit 2, and, especially in drawing input, a character with many stroke counts and a complicated figure can be inputted without a line overlapping by making the most part of screen of the touch panel 14A to be a handwriting input area.

FIG. 8 is an image showing a game controller simulated image which is displayed on a touch panel belonging to the first embodiment of the present invention of a mobile processing communication apparatus, when a game is enjoyed by using the mobile processing communication apparatus in connection with an external unit equipped with a display device.

And FIG. 9 is another outline diagram showing a constitution of an information processing system which is composed by connecting the first embodiment of the present invention of a mobile information processing apparatus and an external unit equipped with a display device, and showing a screen image which is displayed on the screen of the display device.

When a game is enjoyed in the condition that the smart phone 1 is connected with the external output unit 2, a screen image which simulates a game controller is displayed in the most part of screen of the touch panel 14A, and a user can to execute a game program by touching the key display in this game controller simulated image with fingers or a touch pen (stylus).

Since the smart phone 1 is of size which is suitable for touch operation of the key display by thumbs in the condition that it is held by both hands in horizontally long configuration, a similar feeling of operation like stationary game machines such as Sony PlayStation (registered trademark) can be enjoyed.

On the other hand, even a complicated game image can be displayed satisfactorily on the external LCD panel 24A of the external output unit 2, since the size and screen resolution of the external LCD panel 24A are larger than the size and screen resolution of the touch panel 14A, as shown in the figure.

Embodiment 2

FIG. 10 is a block diagram showing a constitution and a function of the second embodiment of the present invention of a mobile information processing apparatus and an information processing system which is composed by connecting the mobile information processing apparatus and an external unit equipped with a display device and an input device, especially in the case that the mobile information processing apparatus is a smart phone.

FIG. 11 is an outline diagram showing a constitution of an information processing system which is composed by connecting the second embodiment of the present invention of a mobile information processing apparatus and an external unit equipped with a display device and an input device.

In the case the smart phone 1 is used solely, functions of this embodiment of the smart phone 1 is the same as those of the first embodiment of the smart phone 1. On the other hand, the smart phone 1 is connected with an external input/output unit 3 by directly inserting it into an insertion part 37 of the chassis of the external input/output unit 3, instead of being connected to an external output unit by a connection cable. Thus, it becomes possible to exchange a signal between the smart phone 1 and the external input/output unit 3 by making an interface part A1_16B1 of the smart phone 1 contact an interface part B1_36B1 of the external input/output unit 3 directly and making an interface part A2_16B2 of the smart phone 1 contact an interface part B2_36B2 of the external input/output unit 3 directly, respectively.

The external input/output unit 3 is equipped with an external keyboard 38 and an external LCD panel 34A, and its appearance is similar with a so-called notebook PC, except that it is equipped with the insertion part 37 in its chassis for inserting a smart phone. However, since it is not equipped inside with a signal processing and control device such as CPU, and OS or application software for itself are not needed, it is can be constituted more cheaply than a notebook PC.

An external manual operation signal, which is generated as a result of the manual operation to the external keyboard 38, is sent to the smart phone 1 via said interface part B2_36B2 and an interface part A2_16B2, and, eventually is processed by the central processing circuit 11B of the smart phone 1. An external display signal, which is generated as a result of the above process, is sent to the external input/output unit 3 via said interface part A1_16B1 and said interface part B1_36B1, and eventually, a screen image is displayed on the external LCD panel 34A as a result that an external LCD driver 34D drives each pixel, which constitutes the screen of the external LCD panel 34A, according to the signal.

Note that sending of the external display signal via said interface part A1_16B1 and said interface part B1_36B1 can be conducted in the non-compressed digital transmission format including at least TMDS, digital RGB, LVDS (or LDI), GVIF, USB, DisplayPort.

On the other hand, the smart phone 1 in this embodiment can be used like a handwriting pad of a so-called notebook PC, when it is connected with the external input/output unit 3 by being inserted in the insertion part 37 of the external input/output unit 3. Thus, a character and a drawing can be inputted by touching the touch panel 14A of the smart phone 1 with fingers or a touch pen (stylus). In this case, the manual operation signal, which is generated by a touch operation, is processed by the central processing circuit 11B of the smart phone 1 in parallel with the external manual operation signal received via the interface part A1_16B1, and a screen image is displayed on the external LCD panel 34A based on the result.

Embodiment 3

FIG. 12 is a block diagram showing a constitution and a function of the third embodiment of the present invention of a mobile information processing apparatus and an information processing system which is composed by connecting the mobile information processing apparatus and an external unit equipped with a touch panel device, especially in the case that the mobile information processing apparatus is a smart phone.

FIG. 13 is an outline diagram showing a constitution of an information processing system which is composed by connecting the third embodiment of the present invention of a mobile information processing apparatus and an external unit equipped with a touch panel device, and showing a screen image which is displayed on the screen of the touch panel device, especially a screen image which is displayed on the screen of the touch panel device of the external unit, when text of an e-mail is inputted by using the mobile processing communication apparatus in connection with an external unit equipped with a touch panel device.

In the case the smart phone 1 is used solely, functions of this embodiment of the smart phone 1 is also the same as those of the first embodiment of the smart phone 1. On the other hand, the smart phone 1 is connected with an external touch panel unit 4 by exchanging a wireless signal between the external touch panel unit 4, instead of being connected to an external output unit by a connection cable. Thus, it becomes possible to exchange a signal between the smart phone 1 and the external touch panel unit 4 by the way that the interface part B1_46B1 of the external touch panel unit 4 receives a wireless signal sent from the interface part A1_16B1 of the smart phone 1 and the interface part A2_16B2 of the smart phone 1 receives a wireless signal sent from an interface part B2_46B2 of the external touch panel unit 4, Note that, hereinafter, it is assumed that a screen's resolution of the external touch panel 24A is XGA (horizontal× vertical=768×1024 pixels, in the case of vertically long configuration) in principle, but another resolution is possible.

When text of an e-mail is inputted by using the information processing system which is composed by connecting the smart phone 1 in this embodiment and the external touch panel unit 4, an external touch panel 44A of the external touch panel unit 4 is divided into an external touch panel display area 44A1 and an external touch panel input area 44A2, and keys, such as characters, numbers, and symbols, are displayed on the external touch panel input area 44A2. This operation method is fundamentally as same as that in the case when a smart phone in the first embodiment is used solely, but the screen resolution of the external touch panel 44A can be set XGA as mentioned above, since a size of the external touch panel unit 4 can be larger than the smart phone 1. Therefor, it is not necessary to change frequently input screens of the external touch panel input area 44A2 and nor to repeat scrolling of a screen repeatedly for checking the whole text of an e-mail, unlike the sole use case of a smart phone.

The appearance of the external touch panel unit 4 is similar with a so-called tablet PC. However, since it is not equipped inside with a signal processing and control device such as CPU, and OS or application software for itself are not needed, it is can be constituted more cheaply than a tablet PC.

An external manual operation signal, which is generated as a result of the manual operation to the external touch panel 44A, is sent to the smart phone 1 via said interface part B2_46B2 and said interface part A2_16B2, and, eventually is processed by the central processing circuit 11B of the smart phone 1. An external display signal, which is generated as a result of the above process, is sent to the external touch panel unit 4 via said interface part A1_16B1 and said interface part B1_46B1, and eventually, a screen image is displayed on the external touch panel 44A as a result that an external LCD driver 44D drives each pixel, which constitutes the screen of the external touch panel 44A, according to the signal.

Note that sending of the external display signal from said interface part A1_16B1 to said interface part B1_46B1 can be conducted in the non-compressed digital transmission format including at least WirelessHD (High Definition), WHDI (Wireless Home Digital Inter-face) and WiGig (Wireless Gigabit).

And sending of the manual operation signal from said interface part B2_46B2 to said interface part B1_46B1 can be conducted in Bluetooth format.

FIG. 14 is an explanation diagram showing an exchange of information between an information processing system, which is composed by connecting the third embodiment of the present invention of a mobile information processing apparatus and an external unit equipped with a touch panel, and a web server connected to the Internet.

When the information processing system, which consisted of the smart phone 1 and the external touch panel unit 4, accesses a web server 61 which is connected to the Internet 6, the central processing circuit 11B in the smart phone 1 sends a user-agent to the web server 61 via the bus 17, the baseband processor 11A, the RF sending/receiving part 12B, and the communication antenna 12A, according to a browser program stored in the flash memory 15A. (The component of the smart phone 1 is not shown in FIG. 14).

At that time, the central processing circuit 11B makes the information, which specifies whether it has ordered the graphics controller 14B to send bit-mapped data read from the VRAM 14C to the LCD driver 14D to or to the TMDS transmitter 16A, to be included in use-agent along with information which shows that the smart phone 1 has a sending function of a high resolution external display signal On the other hand, the web server 61 stores both of a set of data file consisting of a markup document file and its link file, which correspond to web pages assumed to be browsed by a attached display of a cellular phone or a smart phone, and a set of data file without any restriction in size, which correspond to web pages assumed to be browsed by a PC.

Hereinafter, "a set of data file, which correspond to web pages assumed to be browsed by a attached display of a cellular phone or a smart phone" is referred as "a set of data files for mobile". And "a set of data file, which correspond to web pages assumed to be browsed by a PC" is referred as "a set of data files for PC".

And moreover, the web server 61 selects a preferable set of data files and sends it to an information processing system composed of the smart phone 1 and the external touch panel 4, according to the information related to sending command, which is included in user-agent, by using a CGI function or a PHP function. Thus, it sends a set of data files for mobile in the case when the central processing circuit 11B commands to send the bit-mapped data to the LCD driver 14D, and sends a set of data files for PC in the case when the central processing circuit 11B commands to send the bit-mapped data to the TMDS transmitter 16A, respectively.

As a result, with an information processing system composed of the smart phone 1 and external touch panel devices, preferable web pages, which corresponds to a screen's resolution of the display panel in an active condition, can be browsed.

Since, moreover, the web server 61 is preparing two or more websites from which an image data file can be downloaded by accessing it and performing download operation, and it distributes automatically so that the web page from which both image data file of the half VGA and of XGA can be downloaded at once by one operation may be accessed, according to the information related to the sending function of an external display signal included in user-agent sent from the smart phone 1. Thereby, the user can download both image data file of the half VGA and of XGA at once by one operation using the touch panel 14A of the smart phone 1 or the external touch panel 44A of the external touch panel unit 4.

Embodiment 4

FIG. 15 is a block diagram showing a constitution and a function of an information processing system which is composed by connecting the forth embodiment of the present invention of a mobile information processing apparatus, an external unit equipped with a touch panel device and an external unit equipped with a display device, especially in the case that the mobile information processing apparatus is a smart phone.

FIG. 16 is an outline diagram showing a constitution of an information processing system which is composed by connecting the forth embodiment of the present invention of a mobile information processing apparatus, an external unit equipped with a touch panel device and an external unit equipped with a display device, and showing a screen image which is displayed on the screen of the display device and on the screen of the touch panel device, especially a screen image which is displayed on the screen of the touch panel device of the external unit and on the screen of the display device of the external unit, when text of an e-mail is inputted by using the mobile processing communication apparatus in connection with an external unit equipped with a touch panel device and an external unit equipped with a display device.

In the case the smart phone 1 is used solely, functions of this embodiment of the smart phone 1 is also the same as those of the first embodiment of the smart phone 1. On the other hand, the smart phone 1 is connected to an external output unit by a connection cable, and connected to the external touch panel unit 4 by exchanging a wireless signal between the external touch panel unit 4.

Note that, hereinafter, it is assumed that a screen's resolution of the external touch panel 44A of an external touch panel 4 is XGA (horizontal×vertical=1024×768 pixels, in the case of horizontally long configuration) in principle and a screen's resolution of the external LCD panel 24A of an external output unit is FWXGA (horizontal×vertical=1366×768 pixels, in the case of horizontally long configuration) in principle, but another resolution is possible.

When text of an e-mail is inputted by using the information processing system constituted by connecting the smart phone 1 in this embodiment, the external touch panel unit 4 and the external output unit 3, an external touch panel 44A of the external touch panel unit 4 is divided into the external touch panel input area 44A2 and an external touch panel handwriting area 44A3, and keys, such as characters, numbers, and symbols, are displayed on the external touch panel input area 44A2. This operation method is fundamentally as same as that in the case when a smart phone in the first embodiment is used solely, but it can also set screen resolution of the external touch panel 44A to XGA as mentioned above since a size of the external touch panel unit 4 can be larger than the smart phone 1. Therefor, it is not necessary to change frequently input screens of the external touch panel input area 44A2 and nor to repeat scrolling of a screen repeatedly for checking the whole text of an e-mail, unlike the sole use case of a smart phone.

Moreover, a figure and a character can be inputted by hand writing using a finger or a touch pen (stylus) in the external touch panel handwriting area 44A3, in parallel to the character input by the touch operation in the external touch panel input area 44A2, since the external touch panel handwriting area 44A3 is formed in the external touch panel 44A. And a character with many stroke counts and a complicated figure can be inputted by hand writing more certainly than the case of the information processing system constituted by connecting a smart phone of the first embodiment and external output unit, since the area is larger than that of the whole touch panel part of the smart phone 1.

An external manual operation signal, which is generated as a result of the manual operation to the external touch panel 44A, is sent to the smart phone 1 via said interface part B2_46B2 and said interface part A2_16B2, and the central processing circuit 11B of the smart phone 1 works in the following control mode: It commands the graphic controller 14B not only to generate bit-mapped data describing an image with a resolution corresponding to the screen resolution of the external touch panel 44A and send it to a TMDS transmitter 1_16A1, but also to generate bit-mapped data describing an image with a resolution corresponding to the screen resolution of the external LCD panel 24A of the external output unit 2 and send it to a TMDS transmitter 2_16A2.

The bit-mapped data sent to the TMDS transmitter 1_16A1 is converted to the external display signal, which is sent in a TMDS format, and the signal is received by the interface part B1_46B1 of the external touch panel unit 4 via an interface part A11_16B11 of the smart phone 1. The external display signal is subjected to necessary process in a TMDS receiver 46A and is sent the external LCD driver 44D. And then the external LCD driver 44A drives each pixel which constitutes the screen of the external touch panel 44A. Eventually a screen image is displayed on the external touch panel 44A.

On the other hand, the bit-mapped data sent to the TMDS transmitter 2_16A2 is converted to the external display signal, which is sent in a TMDS format, and the signal is received by the interface part B_26B of the external output unit 2 via an interface part A12_16B12 of the smart phone 1. The external display signal is subjected to necessary process in the TMDS receiver 26A and is sent the external LCD driver 24D. And then the external LCD driver 24A drives each pixel which constitutes the screen of the external touch panel 24A. Eventually a screen image is displayed on the external touch panel 24A.

Note that sending of the external display signal from said interface part A11_16B11 to said interface part B1_46B1 can be conducted in the non-compressed digital transmission format including at least WirelessHD (High Definition), WHDI (Wireless Home Digital Inter-face) and WiGig (Wireless Gigabit).

And sending of the external display signal from said interface part A12_16B12 to said interface part B_26B can be conducted in the non-compressed digital transmission format including at least TMDS, digital RGB, LVDS (or LDI), GVIF, USB, DisplayPort.

And, moreover, sending of the manual operation signal from said interface part B2_46B2 to said interface part A2_16B2 can be conducted in Bluetooth format.

INDUSTRIAL APPLICABILITY

The present invention is applicable to a variety of industries to manufacture and/or to utilize mobile information processing apparatuses including smart phones and mobile game machines. Also, it is applicable to industries to manufacture and/or to utilize non-mobile information processing apparatuses including at least PC's and computer game machine.

REFERENCE SIGNS LIST

Figure 1:
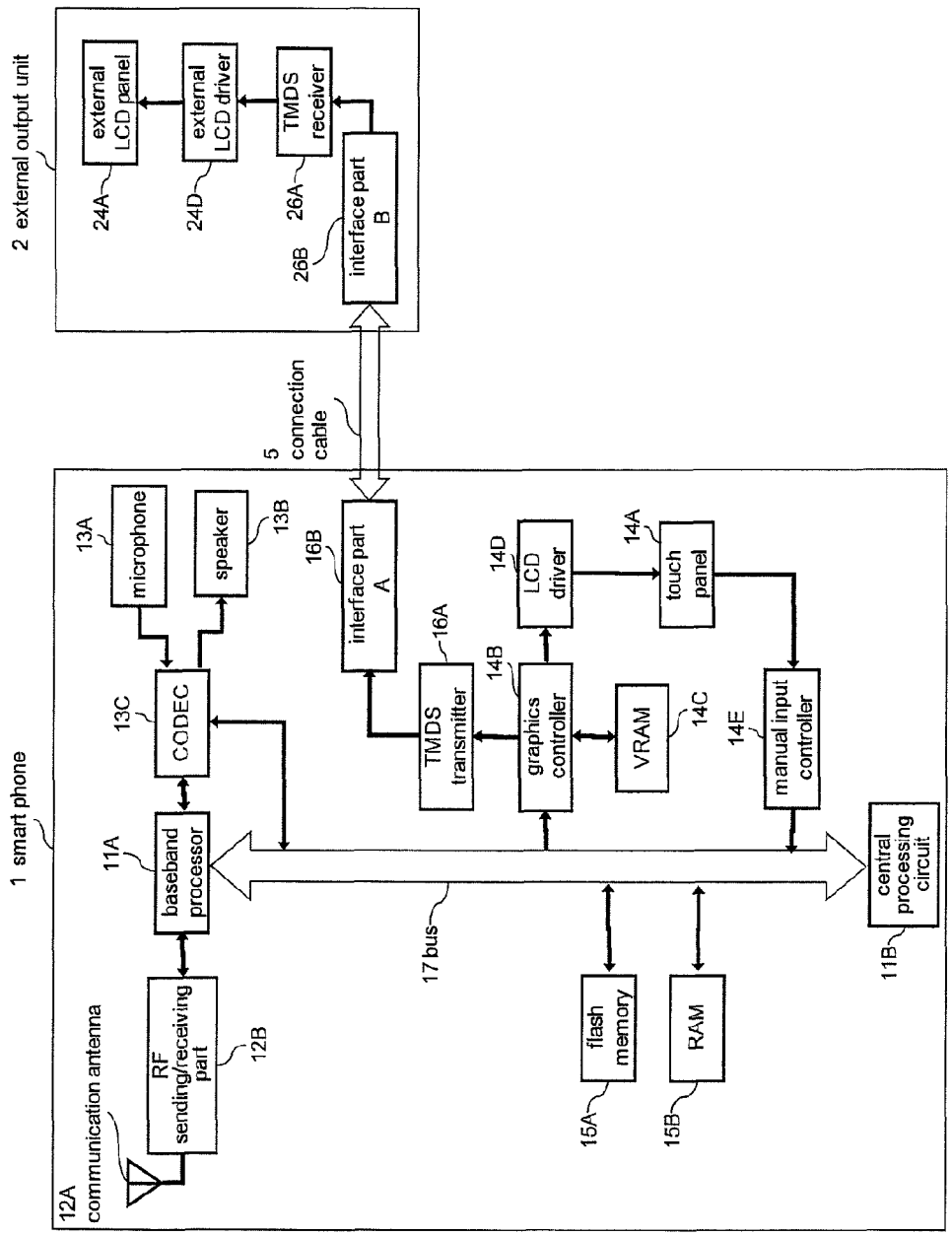
FIG. 1 is a block diagram showing a constitution and a function of the first embodiment of the present invention of a mobile information processing apparatus and an information processing system which is composed by connecting the mobile information processing apparatus and an external unit equipped with a display device.
Figure 2:
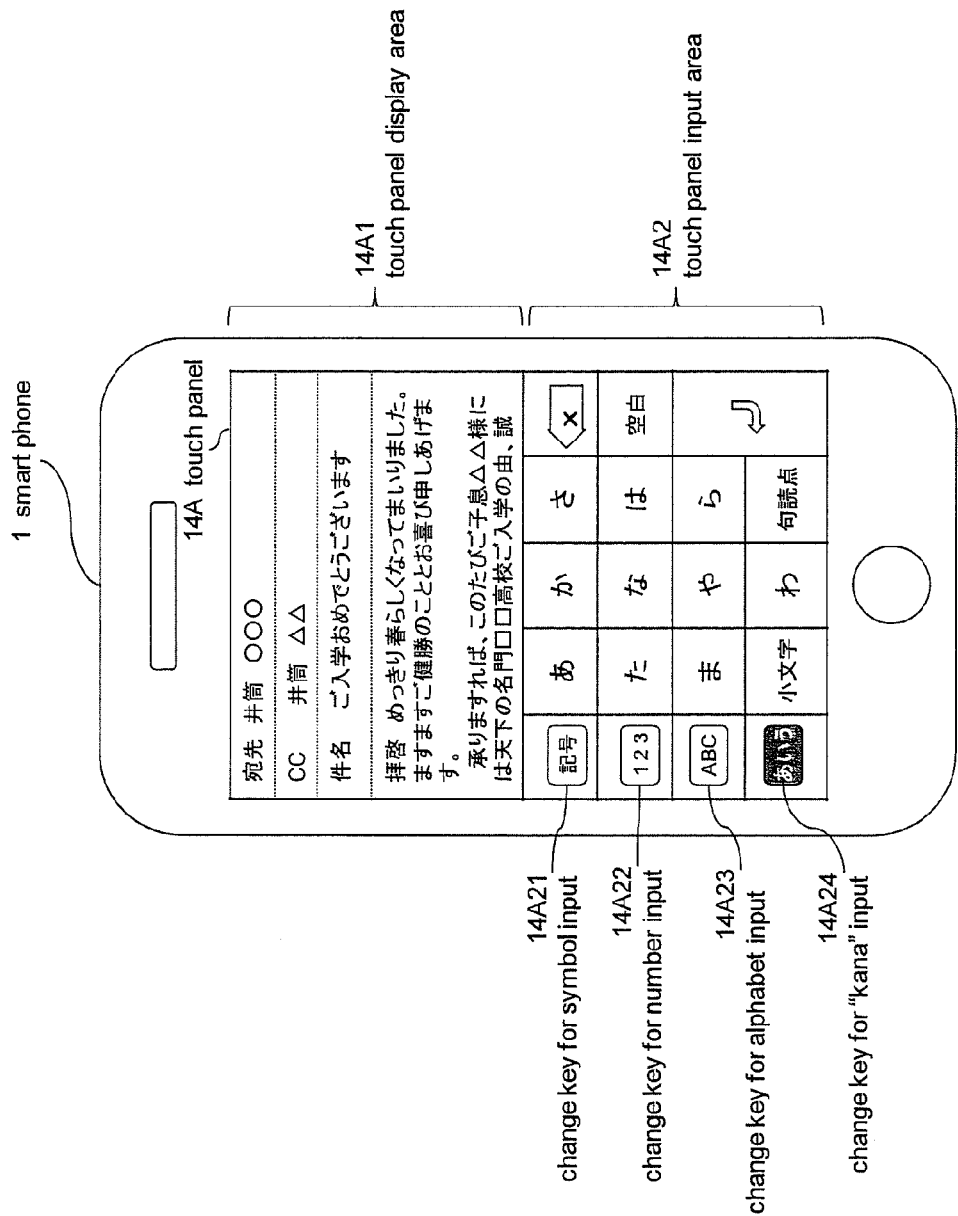
FIG. 2 is an image showing a screen image which is displayed on a touch panel belonging to the first embodiment of the present invention of a mobile processing communication apparatus, when text of an e-mail is inputted by using the mobile processing communication apparatus solely.
Figure 3:
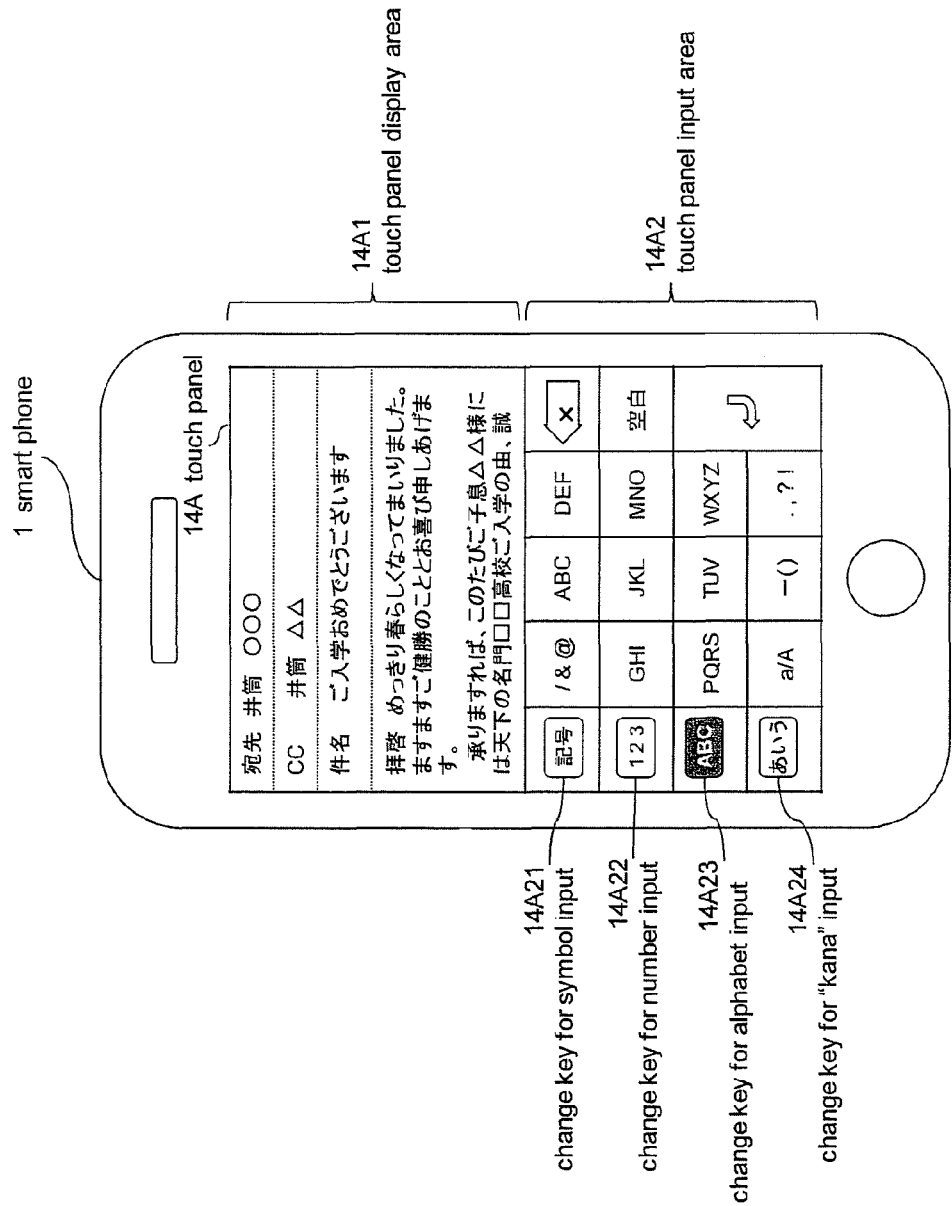
FIG. 3 is another image showing a screen image which is displayed on a touch panel belonging to the first embodiment of the present invention of a mobile processing communication apparatus, when text of an e-mail is inputted by using the mobile processing communication apparatus solely.
Figure 4:
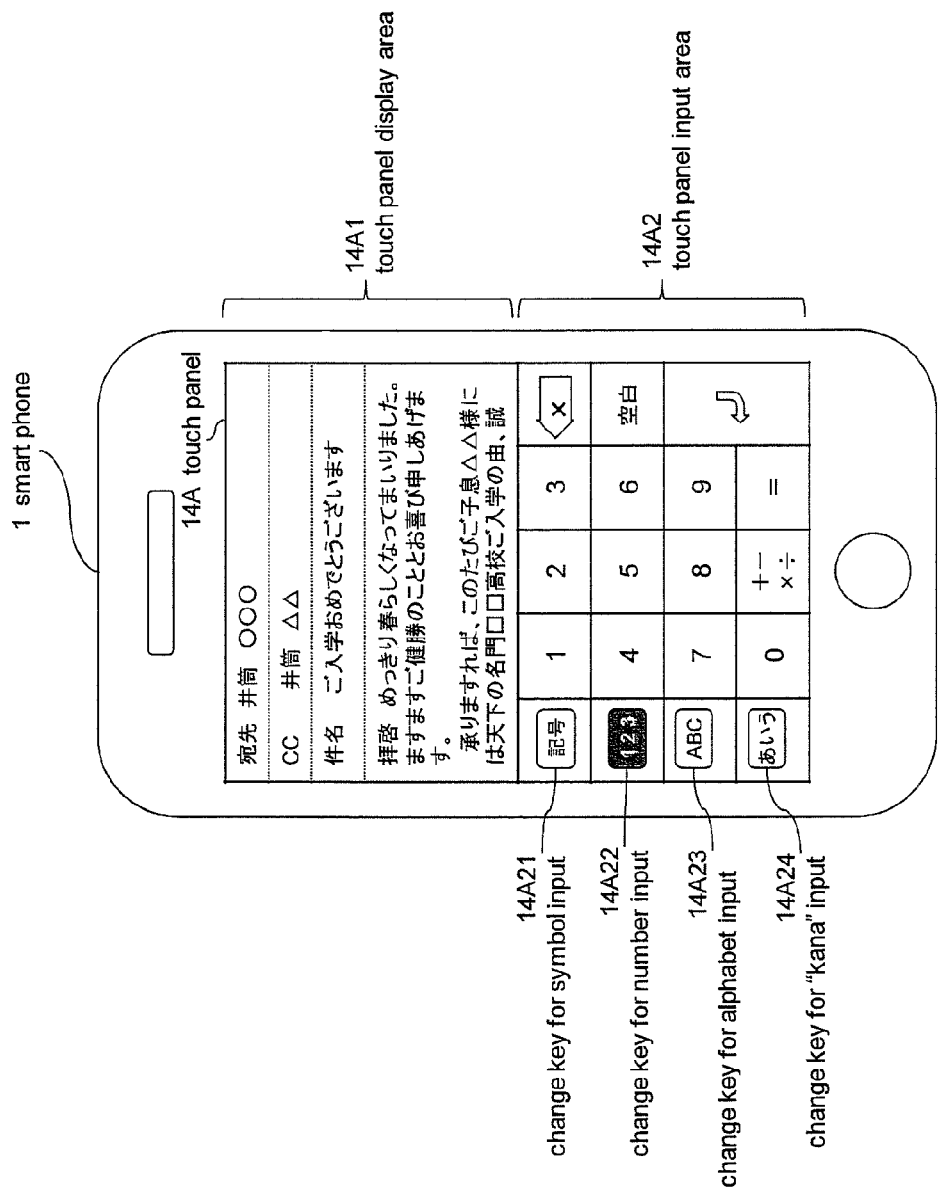
FIG. 4 is yet another image showing a screen image which is displayed on a touch panel belonging to the first embodiment of the present invention of a mobile processing communication apparatus, when text of an e-mail is inputted by using the mobile processing communication apparatus solely.
Figure 5:
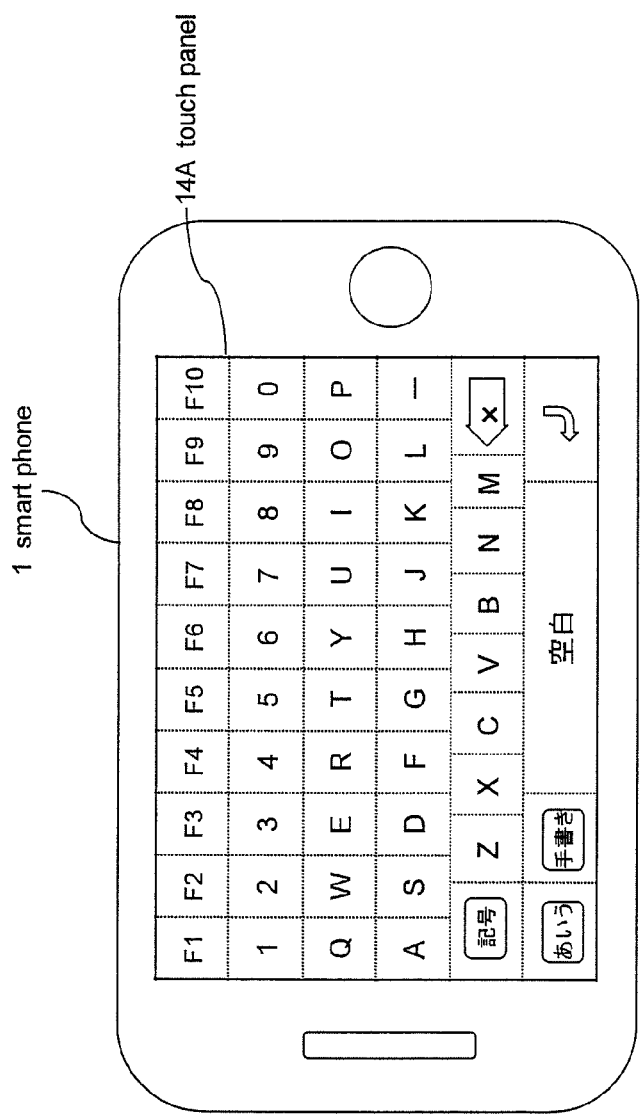
FIG. 5 is an image showing a keyboard simulated image which is displayed on a touch panel belonging to the first embodiment of the present invention of a mobile processing communication apparatus, when text of an e-mail is inputted by using the mobile processing communication apparatus in connection with an external unit equipped with a display device.
Figure 6:
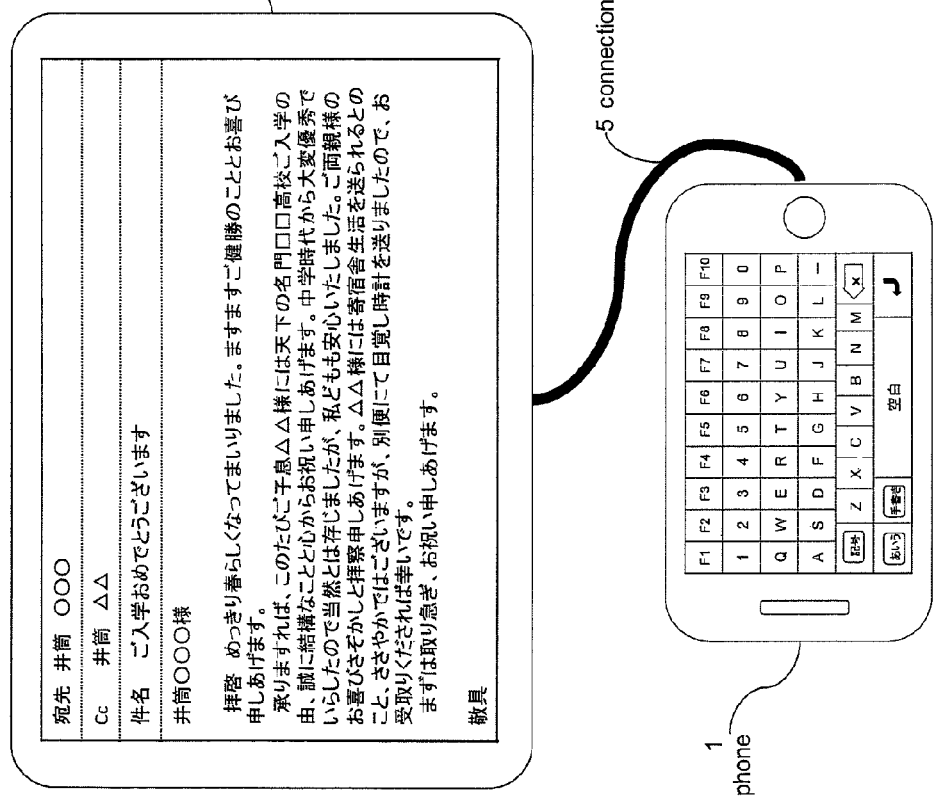
FIG. 6 is an outline diagram showing a constitution of an information processing system which is composed by connecting the first embodiment of the present invention of a mobile information processing apparatus and an external unit equipped with a display device, and an screen image which is displayed on the screen of the display device.
Figure 7:
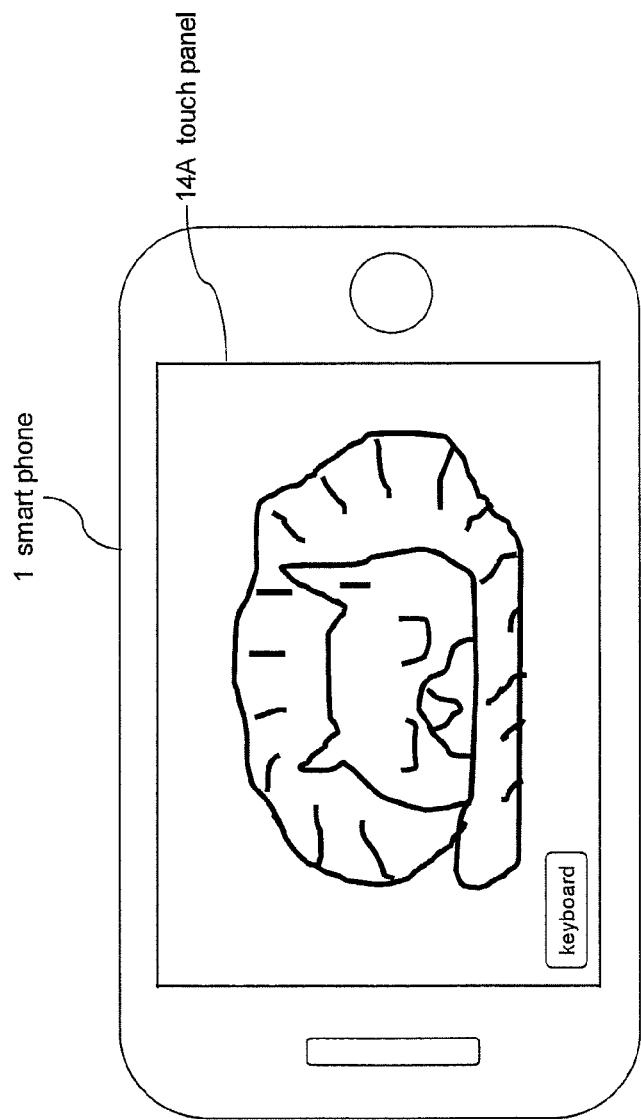
FIG. 7 is an image showing a drawing image which is displayed in a handwriting input area of a touch panel belonging to the first embodiment of the present invention of a mobile processing communication apparatus, when a drawing is inputted by using the mobile processing communication apparatus in connection with an external unit equipped with a display device.
Figure 8:
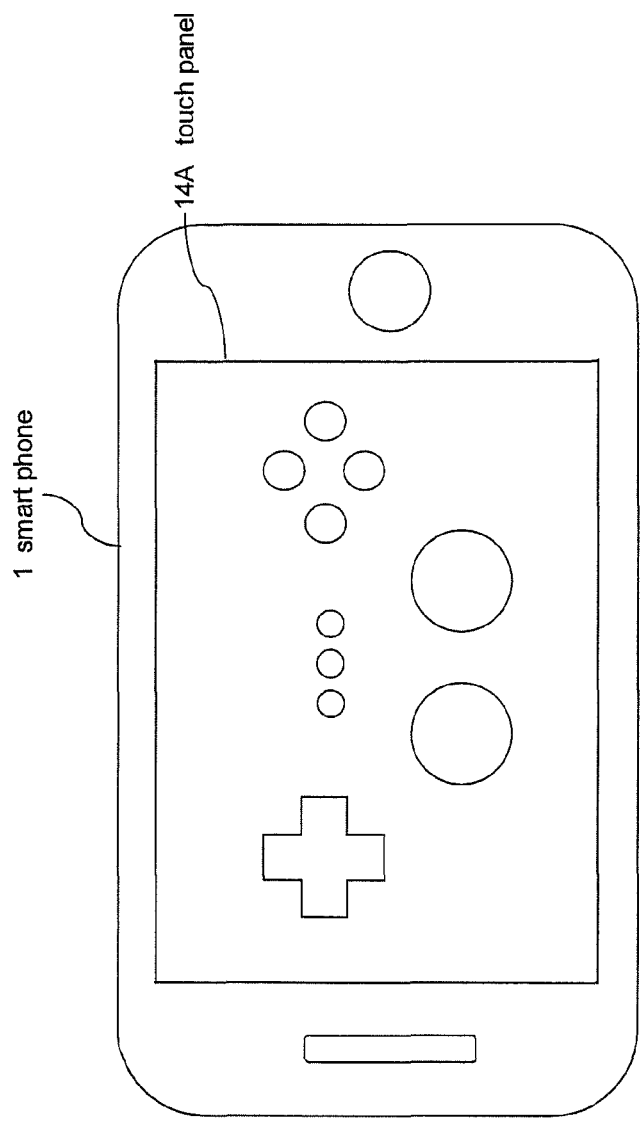
FIG. 8 is an image showing a game controller simulated image which is displayed on a touch panel belonging to the first embodiment of the present invention of a mobile processing communication apparatus, when a game is enjoyed by using the mobile processing communication apparatus in connection with an external unit equipped with a display device.
Figure 9:
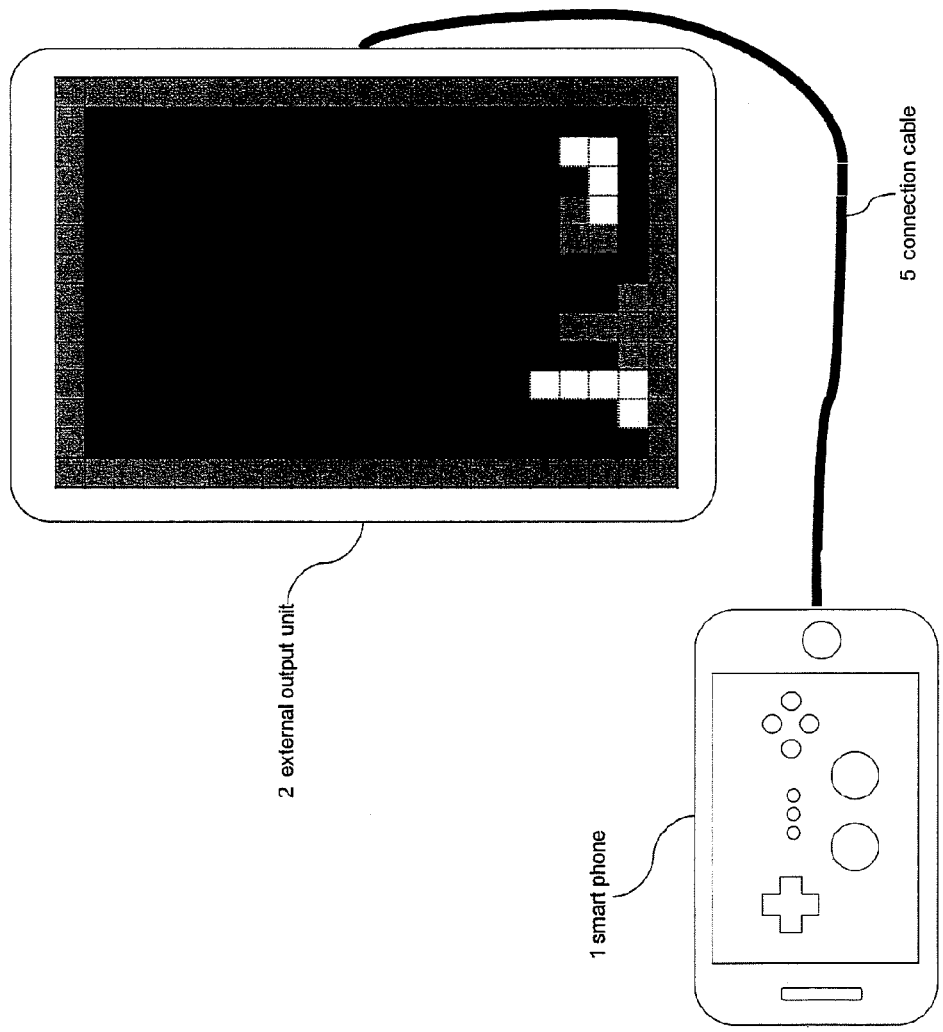
FIG. 9 is another outline diagram showing a constitution of an information processing system which is composed by connecting the first embodiment of the present invention of a mobile information processing apparatus and an external unit equipped with a display device, and showing a screen image which is displayed on the screen of the display device.
Figure 10:
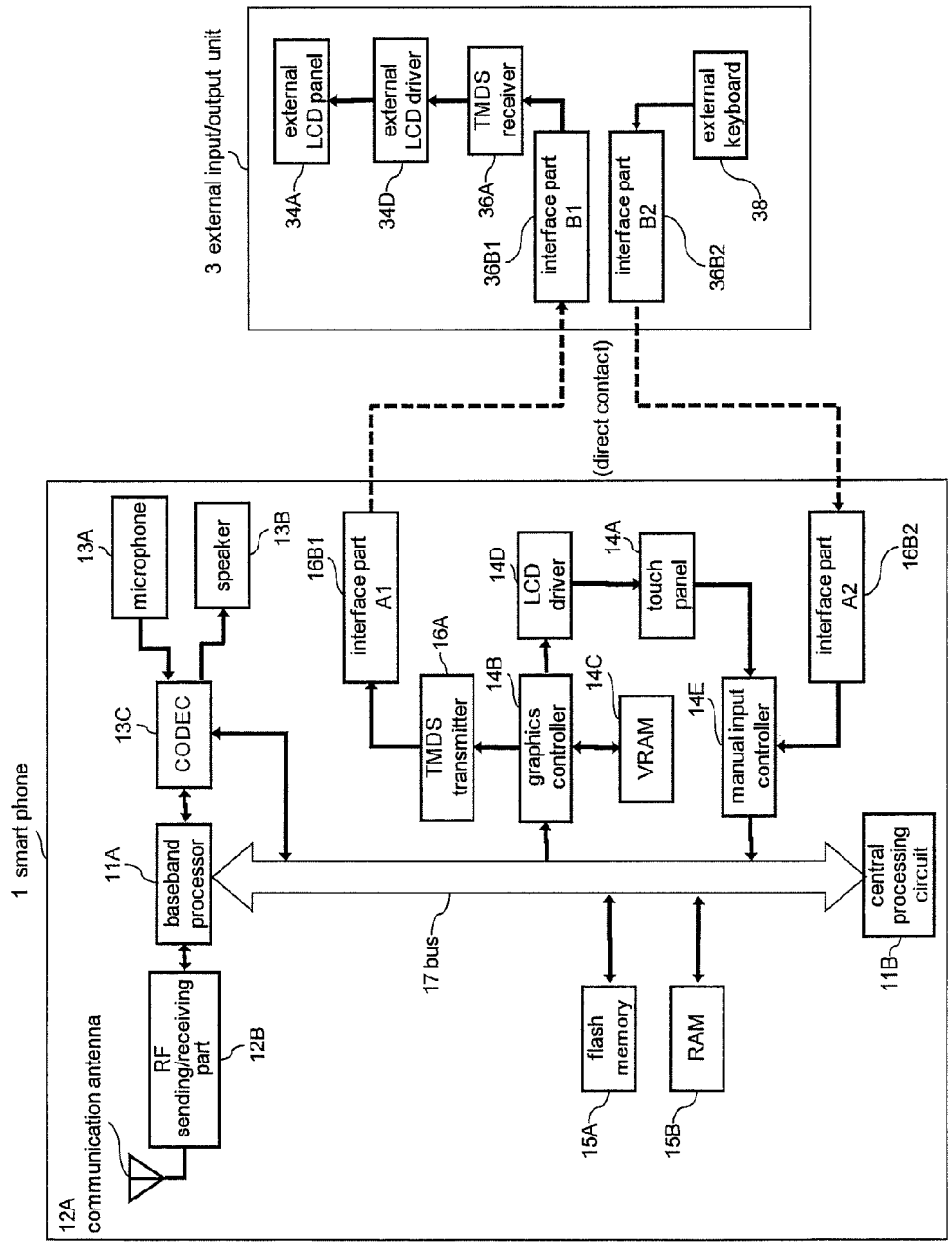
FIG. 10 is a block diagram showing a constitution and a function of the second embodiment of the present invention of a mobile information processing apparatus and an information processing system which is composed by connecting the mobile information processing apparatus and an external unit equipped with a display device and an input device.
Figure 11:
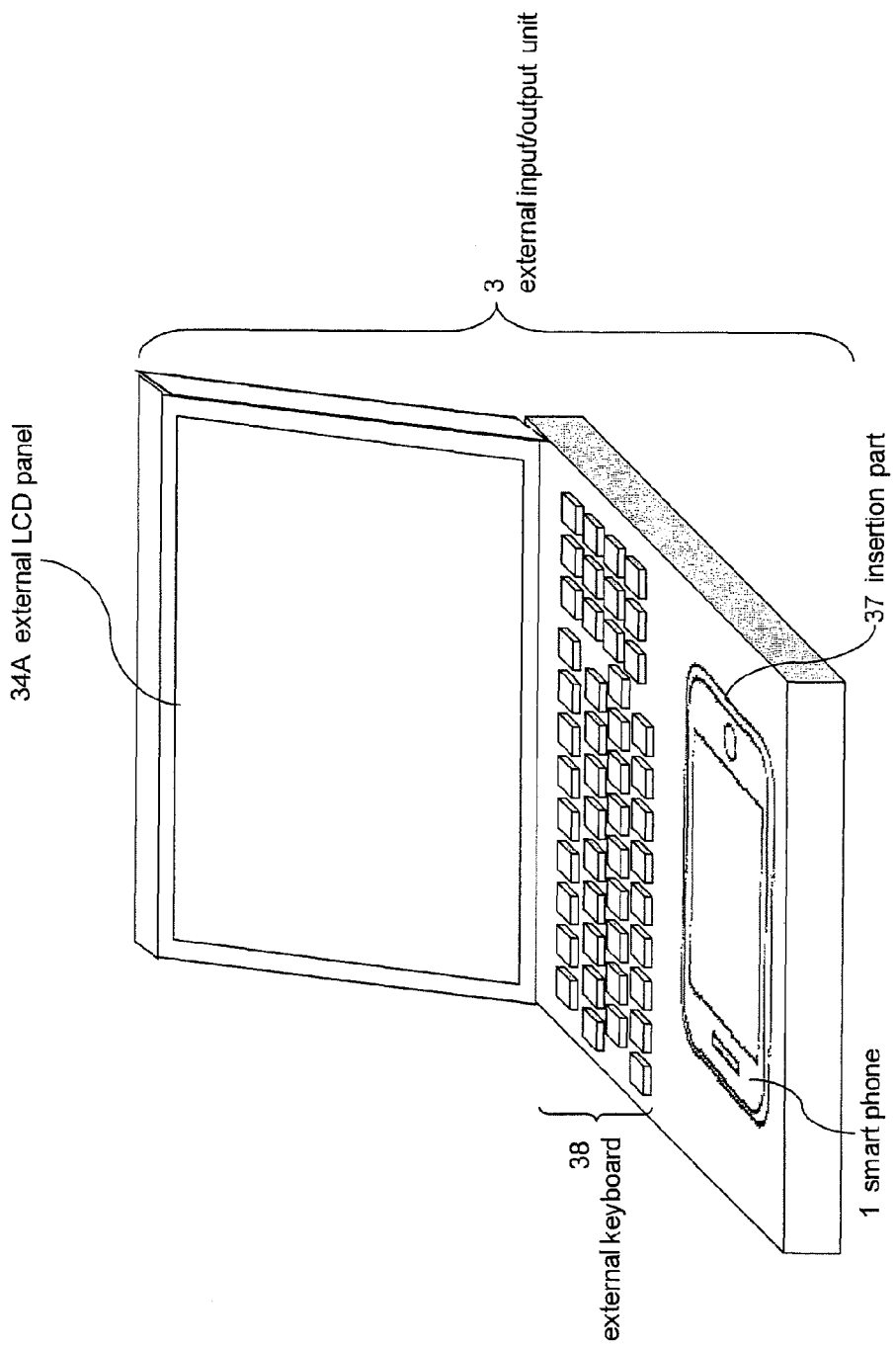
FIG. 11 is an outline diagram showing a constitution of an information processing system which is composed by connecting the second embodiment of the present invention of a mobile information processing apparatus and an external unit equipped with a display device and an input device.
Figure 12:
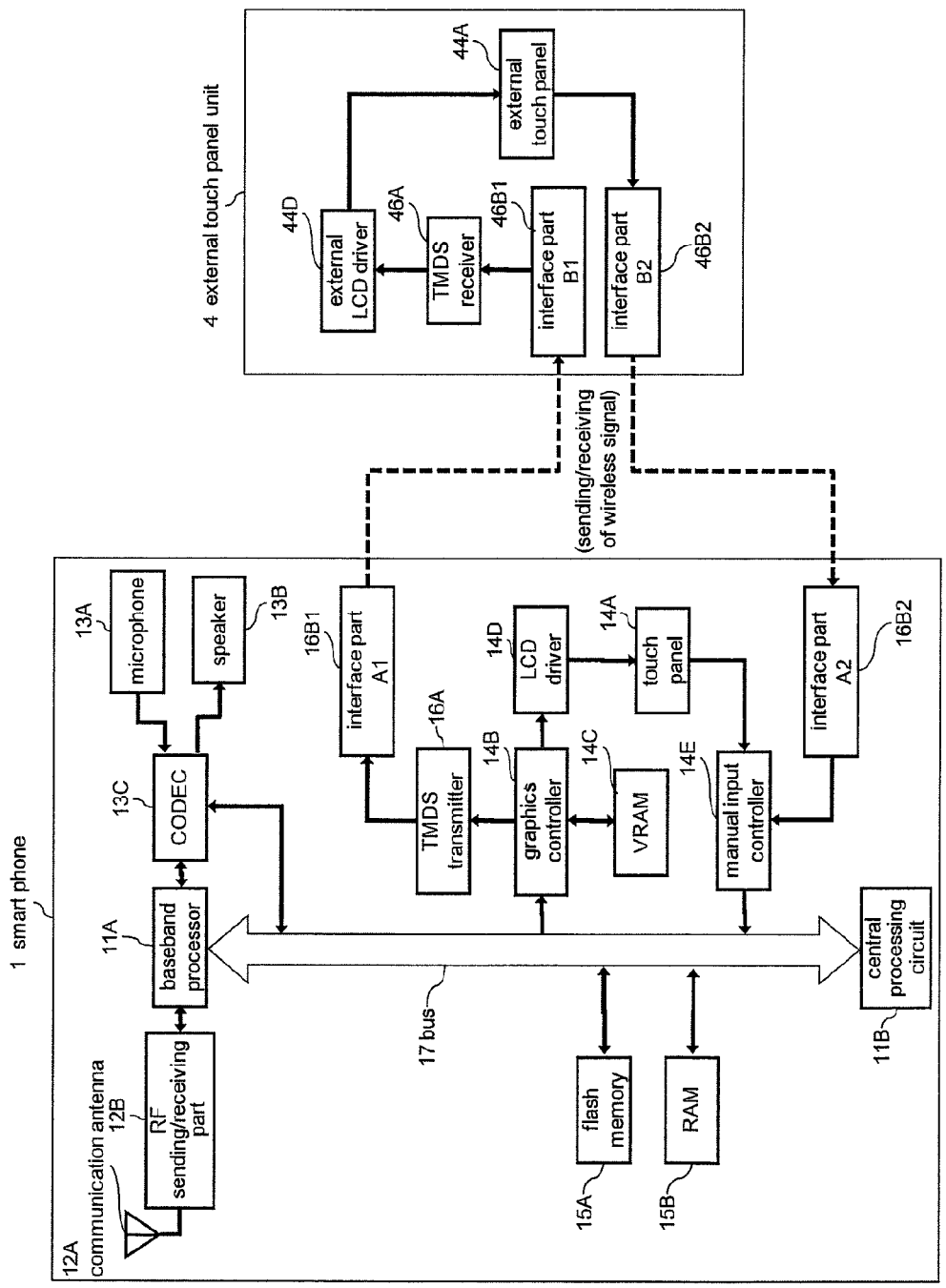
FIG. 12 is a block diagram showing a constitution and a function of the third embodiment of the present invention of a mobile information processing apparatus and an information processing system which is composed by connecting the mobile information processing apparatus and an external unit equipped with a touch panel device.
Figure 13:
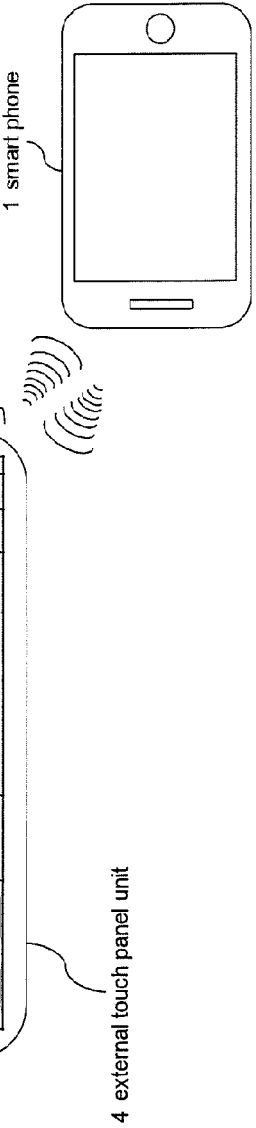
FIG. 13 is an outline diagram showing a constitution of an information processing system which is composed by connecting the third embodiment of the present invention of a mobile information processing apparatus and an external unit equipped with a touch panel device, and showing a screen image which is displayed on the screen of the touch panel device.
Figure 14:
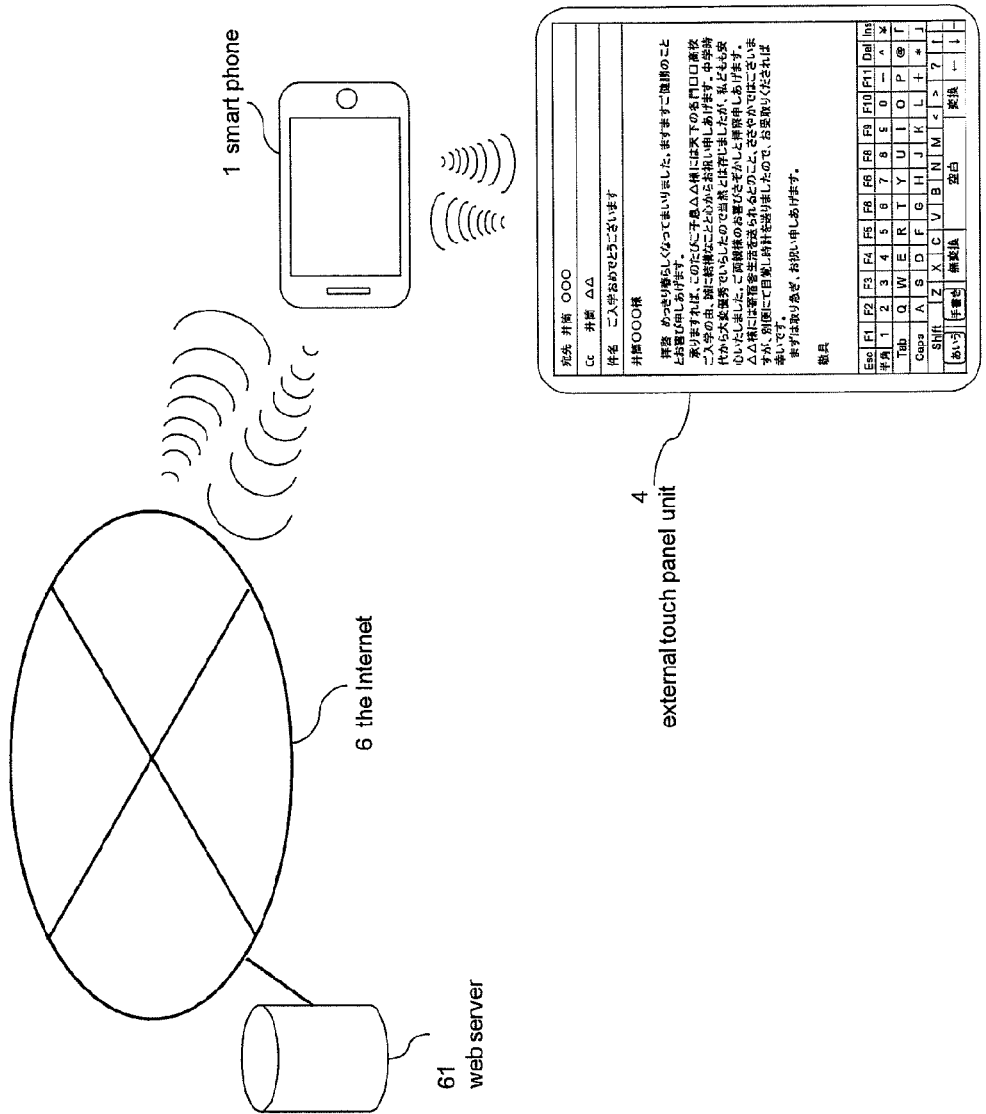
FIG. 14 is an explanation diagram showing an exchange of information between an information processing system, which is composed by connecting the third embodiment of the present invention of a mobile information processing apparatus and an external unit equipped with a touch panel, and a web server connected to the Internet.
Figure 15:
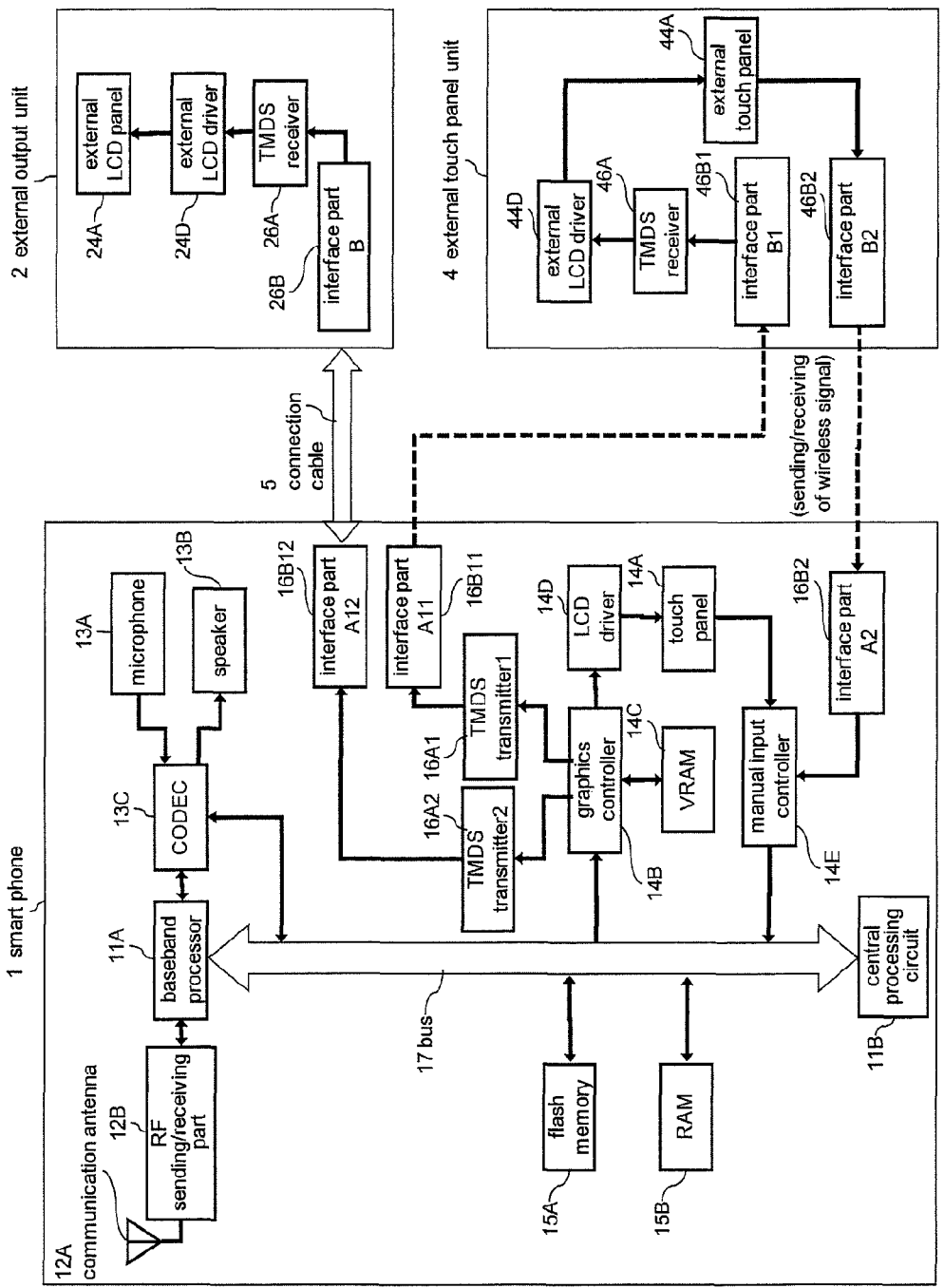
FIG. 15 is a block diagram showing a constitution and a function of an information processing system which is composed by connecting the forth embodiment of the present invention of a mobile information processing apparatus, an external unit equipped with a touch panel device and an external unit equipped with a display device.
Figure 16:
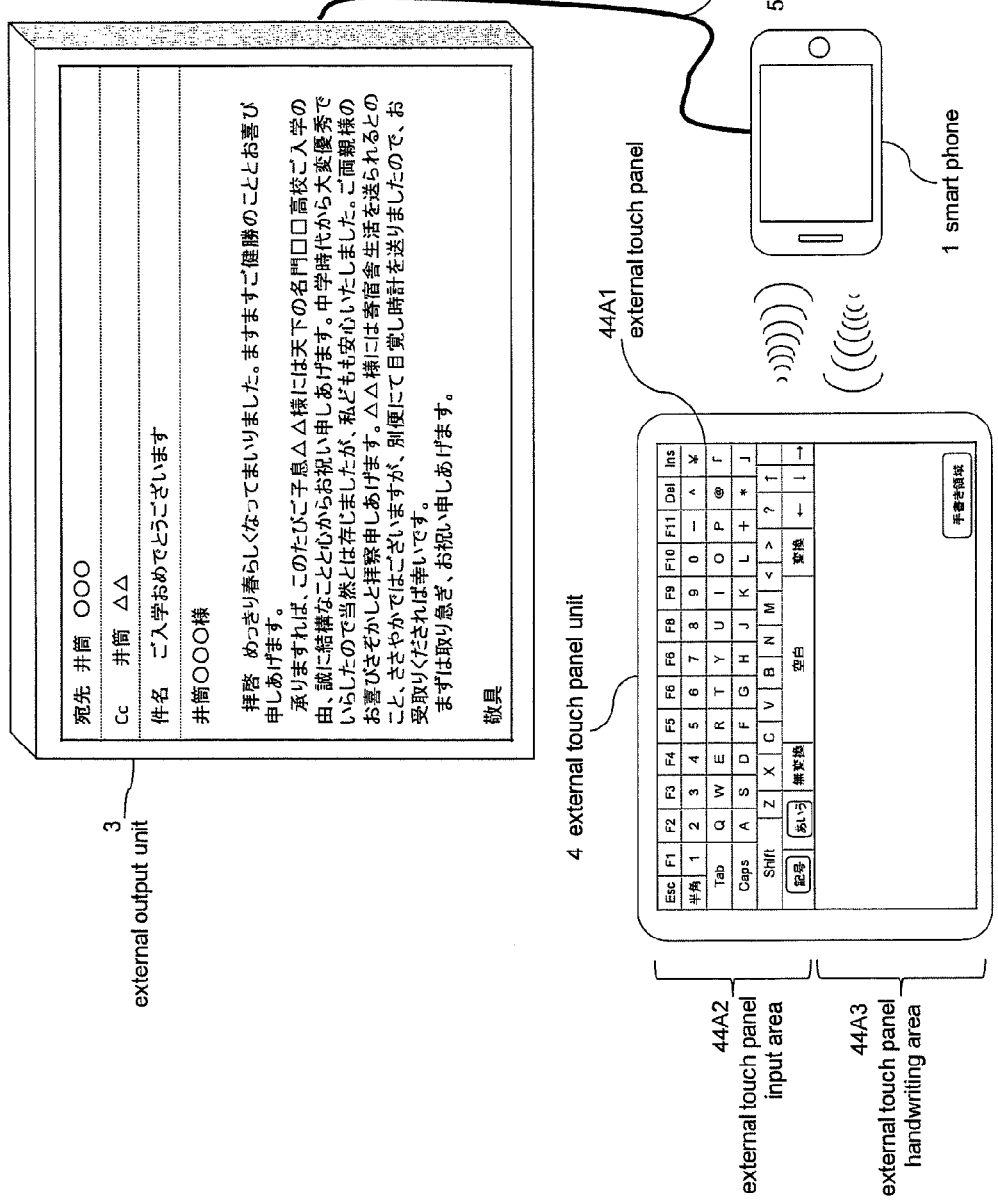
FIG. 16 is an outline diagram showing a constitution of an information processing system which is composed by connecting the forth embodiment of the present invention of a mobile information processing apparatus, an external unit equipped with a touch panel device and an external unit equipped with a display device, and showing a screen image which is displayed on the screen of the display device and on the screen of the touch panel device.

1 . . . smart phone
11A . . . baseband processor
11B . . . central processing circuit
12A . . . communication antenna
12B . . . RF sending/receiving part
13A . . . microphone
13B . . . speaker
13C . . . CODEC
14A . . . touch panel
14A1 . . . touch panel display area 14A2 . . . input area of touch panel
14A21 . . . change key for symbol input
14A22 . . . change key for number input
14A23 . . . change key for alphabet input
14A24 . . . change key for "kana" input
14B . . . graphics controller
14C . . . VRAM
14D . . . LCD driver
14E . . . manual input controller
15A . . . flash memory
15B . . . RAM
16A . . . TMDS transmitter
16A1 . . . TMDS transmitter 1
16A2 . . . TMDS transmitter 2
16B . . . interface part A
16B1 . . . interface part A1
16E11 . . . interface part A11
16E12 . . . interface part A12
16B2 . . . interface part A2
17 bus
2 . . . external output unit
24A . . . external LCD panel
24D . . . external LCD driver
26A . . . TMDS receiver
26B . . . interface part B
3 . . . external input/output unit
34A . . . external LCD panel
34D . . . external LCD driver
36A . . . TMDS receiver
36B1 . . . interface part B1
36B2 . . . interface part B2
37 . . . insertion part
38 . . . external keyboard
4 . . . external touch panel unit
44A . . . external touch panel
44A1 . . . external touch panel display area
44A2 . . . external touch panel input area
44A3 . . . external touch panel handwriting area
44D . . . external LCD driver
46A . . . TMDS receiver
46B1 . . . interface part B1
46B2 . . . interface part B2
5 . . . connection cable
6 . . . the Internet
61 . . . web server

The invention claimed is:

1. A mobile information processing apparatus comprising:
a touch panel device which has the following functions:
   a display function to indicate an image on a screen according to a digital display signal, which is received from aftermentioned signal processing and control device; and
   an input function to detect a manual operation including at least a touch or a push of a screen surface and a shield of incoming light and to generate and send a manual operation signal to aftermentioned signal processing and control device, wherein the manual operation signal is a signal corresponding to a manual operation;
a storage device which stores a program, which activates aftermentioned signal processing and control device;
a signal processing and control device which generates a digital display signal, according to the manual operation signal received from said touch panel device and the program stored in said storage device, and sends the digital display signal to said touch panel device and/or aftermentioned external output interface device; and
an external output interface device which is connected to an external unit with a display device, and sends an external display signal to the external unit according to the digital display signal received from said signal processing and control device, wherein said external unit with a display device is an external unit equipped with or connected to a display device;
wherein said signal processing and control device is configured to alternatively select the following two control modes:
   control mode 1, in which a digital display signal of user interface screen for use without connecting said external output interface device to said external unit with a display device is generated and sent to said touch panel device; and
   control mode 2, in which a digital display signal of user interface screen for use with connecting said external output interface device to said external unit with a display device is generated and sent to said touch panel device.

2. A mobile information processing apparatus according to claim 1,
further comprising a connection detection device which detects that said external unit is connected to said external output interface device in the condition that the display device is operable, and sends a signal to said signal processing and control device;
wherein said signal processing and control device selects control mode 2 automatically or according to the manual operation signal from said touch panel device, when receiving a signal, which means that said external unit is connected to said external output interface device in the condition that the display device is operable.

3. A mobile information processing apparatus according to claim 1,
wherein said signal processing and control device generates and sends a digital display signal of an image different from said user interface screen to said external output interface device in said control mode 2.

4. A mobile information processing apparatus according to claim 1,
wherein said signal processing and control device generates and sends a higher-resolution digital display signal to said external output interface device in said control mode 2, wherein the higher-resolution digital display signal is a digital display signal of which intrinsic resolution is higher than the screen resolution of said touch panel device.

5. A mobile information processing apparatus according to claim 1,
wherein said signal processing and control device sends a digital display signal of user interface screen with a keyboard simulated image displayed in the whole or in the most part of the touch panel device, and selects keyboard display sub-mode, in which a manual operation signal to a keyboard simulated image display area, which is received from said touch panel device, is converted to character data in said control mode 2, wherein the keyboard simulated image is an image which simulates a keyboard for a character input, and the manual operation signal is a signal corresponding to a manual operation.

6. A mobile information processing apparatus according to claim 1,
wherein said signal processing and control device sends a digital display signal of user interface screen with a handwriting input area displayed in the whole or in the most part of the touch panel device, and selects handwriting input sub-mode, in which a manual operation signal to the handwriting input area, which is received from said touch panel device, is converted to character data or drawing data in said control mode 2, wherein the manual operation signal is a signal corresponding to a manual operation.

7. A mobile information processing apparatus according to claim 1,
wherein said signal processing and control device sends a digital display signal of user interface screen with a game controller simulated image displayed in the whole or in the most part of the touch panel device, and selects game controller display sub-mode, in which a manual operation signal to the game controller simulated image display area, which is received from said touch panel device, is converted to game input data in said control mode 2, wherein the game controller simulated image is an image which simulates a game controller, and the manual operation signal is a signal corresponding to a manual operation.

8. A program which is stored in the storage device of mobile information processing apparatus according to claim 1, which makes said signal processing and control device select said control mode 1 and said control mode 2 alternatively.

9. A mobile information processing apparatus comprising:
a touch panel device which has the following functions:
  a display function to indicate an image on a screen according to a digital display signal, which is received from aftermentioned signal processing and control device; and
  an input function to detect a manual operation including at least a touch or a push of a screen surface and a shield of incoming light and to generate and send a manual operation signal to aftermentioned signal processing and control device, wherein the manual operation signal is a signal corresponding to a manual operation;
a storage device which stores a program, which activates aftermentioned signal processing and control device;
a signal processing and control device which generates a digital display signal, according to the manual operation signal received from said touch panel device and/or aftermentioned external input/output interface device and the program stored in said storage device, and sends the digital display signal to said touch panel device and/or aftermentioned external input/output interface device; and an external input/output interface device which is connected to an external unit equipped with or connected to an external touch panel device, sends an external display signal to the external unit according to the digital display signal received from said signal processing and control device, receives an external manual operation signal inputted by the external touch panel device in the external unit and sends the external manual operation signal to said signal processing and control device;
wherein said signal processing and control device is configured to alternatively select the following two control modes:
  control mode A, in which a digital display signal is generated, according to the external manual operation signal received from said touch panel, and sent to said external touch panel device; and
  control mode B, in which a digital display signal is generated, according to the external manual operation signal received from said external input/output interface, and sent to said external input/output interface device.

10. A mobile information processing apparatus according to claim 9,
further comprising a connection detection device which detects that said external unit is connected to said external input/output interface device in the condition that the external touch panel device is operable, and sends a signal to said signal processing and control device;
wherein said signal processing and control device selects control mode B automatically or according to the external manual operation signal from said external touch panel device, when receiving a signal, which means that said external unit is connected to said external input/output interface device in the condition that the external touch panel device is operable.

11. A mobile information processing apparatus according to claim 9,
wherein said signal processing and control device sends a higher-resolution digital display signal to said external input/output interface device in said control mode B, wherein the higher-resolution digital display signal is a digital display signal of which intrinsic resolution is higher than the screen resolution of said external touch panel device.

12. A program which is stored in the storage device of mobile information processing apparatus according to claim 9, which makes said signal processing and control device select said control mode A and said control mode B alternatively.

* * * * *